(12) United States Patent
Bollard et al.

(10) Patent No.: US 12,478,670 B2
(45) Date of Patent: *Nov. 25, 2025

(54) GENERATING HPV ANTIGEN-SPECIFIC T CELLS FROM A NAÏVE T CELL POPULATION

(71) Applicant: CHILDREN'S NATIONAL MEDICAL CENTER, Washington, DC (US)

(72) Inventors: Catherine Bollard, Washington, DC (US); Conrad Cruz, Washington, DC (US); Patrick Hanley, Washington, DC (US); Michael Keller, Washington, DC (US)

(73) Assignee: CHILDREN'S NATIONAL MEDICAL CENTER, Washington, DC (US)

( * ) Notice: Subject to any disclaimer, the term of this patent is extended or adjusted under 35 U.S.C. 154(b) by 1044 days.

This patent is subject to a terminal disclaimer.

(21) Appl. No.: 17/404,105

(22) Filed: Aug. 17, 2021

(65) Prior Publication Data
US 2021/0380943 A1    Dec. 9, 2021

Related U.S. Application Data

(60) Continuation-in-part of application No. 17/331,296, filed on May 26, 2021, and a continuation-in-part of application No. 17/152,149, filed on Jan. 19, 2021, now Pat. No. 11,649,437, which is a division of application No. 15/771,648, filed on Apr. 27, 2018, now Pat. No. 10,934,525, said application No. 17/331,296 is a continuation of application No. 15/563,854, filed as application No. PCT/US2016/059683, filed as application No. PCT/US2016/023413 on Mar. 21, 2016.

(60) Provisional application No. 62/248,818, filed on Oct. 30, 2015, provisional application No. 62/135,888, filed on Mar. 20, 2015, provisional application No. 62/135,851, filed on Mar. 20, 2015.

(51) Int. Cl.
| | |
|---|---|
| *A61K 35/17* | (2025.01) |
| *A61K 39/295* | (2006.01) |
| *A61K 40/11* | (2025.01) |
| *A61K 40/46* | (2025.01) |
| *C07K 14/075* | (2006.01) |
| *C07K 14/535* | (2006.01) |
| *C07K 14/54* | (2006.01) |
| *C07K 14/55* | (2006.01) |
| *C12N 5/0783* | (2010.01) |

(52) U.S. Cl.
CPC ............ *A61K 39/295* (2013.01); *A61K 40/11* (2025.01); *A61K 40/46* (2025.01); *C07K 14/075* (2013.01); *C07K 14/535* (2013.01); *C07K 14/5406* (2013.01); *C07K 14/55* (2013.01); *C12N 5/0636* (2013.01); *C12N 2501/2307* (2013.01); *C12N 2501/2315* (2013.01); *C12N 2501/51* (2013.01); *C12N 2501/59* (2013.01); *C12N 2502/1121* (2013.01); *Y02A 50/30* (2018.01)

(58) Field of Classification Search
None
See application file for complete search history.

(56) References Cited

U.S. PATENT DOCUMENTS 8,637,307 B2    1/2014    June et al.

FOREIGN PATENT DOCUMENTS

JP    2015-501651 A    1/2015

OTHER PUBLICATIONS

Ramos et al. Human Papillomavirus Type 16 E6/E7-specific Cytotoxic T Lymphocytes for Adoptive Immunotherapy of HPV-associated Malignancies. J Immunother 2013; 36:66-76.*
Israeli Office Action issued Nov. 22, 2021 in Israeli Patent Application No. 254565, therein, 3 pages.
European Office Action issued Jan. 18, 2022 in European Patent Application No. 16 769 492.6, 6 pages.
Australian Office Action issued Mar. 22, 2024 in Australian Patent Application No. 2022201045, 3 pages.
Canadian Office Action issued Jan. 18, 2023 in Canadian Patent Application No. 2,980,039, 5 pages.
Decision of Rejection issued Feb. 14, 2023 in Japanese Patent Application No. 2021-117858 (with English language translation), 18 pages.
A.G. Chapuis, et al., "Transferred WT1-reactive CD8+ T cells can mediate antileukemic activity and persist in post-transplant patients," Sci. Transl. Med., vol. 5, No. 174, Feb. 27, 2013, 25 pages.
Office Action issued Dec. 20, 2022, in corresponding Japanese Patent Application No. 2018-500283, 22 pages.
Rejection Decision issued Oct. 13, 2021 in Chinese Patent Application No. 201680016860.1 (with English language translation), 18 pages.
Gerrit Weber, et al., "Generation of Tumor Antigen-Specific T Cell Lines from Pediatric Patients with Acute Lymphoblastic Leukemia—Implications for Immunotherapy," Clinical Cancer Research, vol. 19, No. 18, Sep. 15, 2013, pp. 5079-5091.

(Continued)

*Primary Examiner* — Nianxiang Zou
(74) *Attorney, Agent, or Firm* — Oblon, McClelland, Maier & Neustadt, L.L.P.

(57) ABSTRACT

Safe, rapid, and efficient methods for producing antigen-specific T cells recognizing human papilloma virus (HPV antigens); HPV-specific T cells, and methods for treating HPV infections and HPV-related malignancies by adoptive transfer of HPV-specific T cells.

27 Claims, 8 Drawing Sheets

(56) References Cited

OTHER PUBLICATIONS

Canadian Office Action issued Feb. 25, 2022 in Canadian Patent Application No. 2,980,039, 8 pages.
Patrick J. Hanley, et al., "Functionally active virus-specific T cells that target CMV, adenovirus, and EBY can be expanded from naive T-cell populations in cord blood and will target a range of viral epitopes," Blood, vol. 114, No. 9, Aug. 27, 2009, 11 pages.
Syh-Jae Lin, et al., "Differential Effect of IL-15 and IL-2 on Survival of Phytohemagglutinin-Activated Umbilical Cord Blood T Cells," American Journal of Hematology, vol. 80, 2005, pp. 106-112.
European Office Action issued Jul. 24, 2023 in European Patent Application No. 16769492.6, 5 pages.
Brazilian Office Action issued Oct. 10, 2023 in Brazilian Application 112017020058-9, 9 pages.
Office Action issued Jun. 28, 2022, in corresponding Japanese Patent Application No. 2021-117858 (with English Translation), 11 pages.
Ulrike Gerdemann et al., "Cytotoxic T Lymphocytes Simultaneously Targeting Multiple Tumor-associated Antigens to Treat EBV Negative Lymphoma", Mol. Ther., 2011, vol. 19, No. 12, pp. 2258-2268.
Concetta Quintareili et al., "Cytotoxic T lymphocytes directed to the preferentially expressed antigen of melanoma (Prame) target chronic myeloid leukemia", Blood, 2008, vol. 112, pp. 1876-1885.

\* cited by examiner

GENERATING HPV ANTIGEN-SPECIFIC T CELLS FROM A NAÏVE T CELL POPULATION

CROSS-REFERENCE(S) TO RELATED APPLICATIONS

This application claims priority to U.S. application Ser. No. 15/771,648, which is the U.S. national-stage of PCT/US2016/059683, filed Oct. 31, 2016, which claims priority to U.S. Provisional Application 62/248,818, filed Oct. 30, 2015; and this application claims priority to U.S. application Ser. No. 15/563,854, which is the U.S. national-stage application of PCT/US2016/023413, filed Mar. 21, 2016, which claims priority to U.S. Provisional Application Nos. 62/135,851 and 62/135,888, both filed Mar. 20, 2015. This application is also related to PCT/US2014/62698, filed Oct. 28, 2014, entitled "Expansion of CMV-Specific T cells from CMV-Seronegative Donors". All of the above documents are incorporated by reference.

STATEMENT REGARDING FEDERALLY SPONSORED RESEARCH OR DEVELOPMENT

This research was sponsored in part by a grant from the National Cancer Institute of the National Institutes of Health, grant #: NCI PO1 CA148600-02 awarded to Catherine M. Bollard and Elizabeth J. Shpall.

BACKGROUND OF THE INVENTION

Field of the Invention

The invention falls within the fields of medicine and cellular immunology. It involves a method for producing antigen-specific T cells especially T cells that recognize virus antigens such as those of human papilloma virus (HPV). This method may be performed using the blood of healthy autologous or allogeneic donors or donors who are naïve to a particular epitope or antigen. It also is directed to methods of adoptively transferring antigen-specific T cells to a recipient for the treatment of diseases, disorders, or conditions such as those caused by or associated with human papilloma virus.

Description of the Related Art

Current T cell based immunotherapies use virus-specific and tumor-specific T cells expanded from biological samples containing T cells or precursor T cells. For example, after stem cells are transplanted into a patient whose immune system has been ablated or otherwise impaired, the further transfer of virus-specific T cells into the patient can supplement or response the ability of the patient's immune system to respond to a viral infection. The use of virus-specific T cells is often associated with fewer side effects than other antiviral drug therapies; Leen A M, Bollard C M, Mendizabal A M, et al. Multicenter study of banked third-party virus-specific T cells to treat severe viral infections after hematopoietic stem cell transplantation. *Blood.* 2013; 121: 5113-5123 (incorporated by reference).

T cell-based therapies using expanded virus-specific T cell populations have been shown to exert activity against virus-expressing malignancies and induced a graft-versus-leukemia effect that cleared circulating leukemic blasts; Foster A E, Dotti G, Lu A, et al. Antitumor activity of EBV-specific T lymphocytes transduced with a dominant-negative TGF-beta receptor. *Journal of Immunotherapy.* 2008; 31:500-505; Heslop H E, Slobod K S, Pule M A, et al. Long-term outcome of EBV-specific T cell infusions to prevent or treat EBV-related lymphoproliferative disease in transplant recipients. *Blood.* 2010; 115:925-935; and Melenhorst J J, Castillo P, Hanley P J, et al. Graft versus leukemia response without graft-versus-host disease elicited by adoptively transferred multivirus-specific T cells. *Molecular therapy: the journal of the American Society of Gene Therapy.* 2015; 23:179-183.

These immunotherapies have the advantage of providing lifelong protection by generating memory T cell populations; Heslop, H E, et al., supra. Such T cells are produced from sero-positive donors having non-naïve immune cells (e.g. memory T cells) which have previously encountered these pathogens; Rooney C M, Leen A M, Vera J F, Heslop H E. T lymphocytes targeting native receptors. *Immunological reviews.* 2014; 257:39-55. Cells from the sero-positive donors having memory T cells are easily expanded ex vivo and then adoptively transferred to a recipient. However, T cell based therapies based on expanding pre-existing memory T cell populations to viral antigens or epitopes are ineffective when such memory T cells are not present in a donor in sufficient numbers or where memory T cells do not recognize protective epitopes or antigens of a pathogen.

Memory T cells are antigen-specific T cells that remain long-term after an infection has been eliminated. The memory T cells are quickly converted into large numbers of effector T cells upon re-exposure to the specific invading antigens of a pathogen, thus providing a rapid, augmented response to the invading pathogen. However, naïve cells, such as cord blood cells or other pre-T cells or cells from a naïve donor, that have not been exposed to a pathogen lack memory T cells to that pathogen. For example, healthy donors or subjects never exposed to an immunogenic viral, bacterial, fungal, parasite, or tumor antigens would lack such memory cells. Unfortunately, for many diseases, disorders, or conditions, donors may not have been previously exposed to the associated antigens and thus lack memory T cells. One important example is an infection of an immunocompromised patient with HPV; Stanley M A, et al., HPV: from infection to cancer. *Biochemical Society Transactions.* 2007; 35:1456-1460; Stanley M A & Sterling J C. Host responses to infection with human papillomavirus. *Current problems in dermatology.* 2014; 45:58-74; Stanley M. Immunobiology of HPV and HPV vaccines. *Gynecologic oncology.* 2008; 109:S15-21 (each incorporated by reference). Other examples are HPV-associated malignancies like cervical cancer in immunocompromised, immunosuppressed, or immunoimpaired patients; Furniss C S, et al. Human papillomavirus 16 and head and neck squamous cell carcinoma. *International Journal of Cancer.* 2007; 120: 2386-2392; Psyrri A & DiMaio D. Human papillomavirus in cervical and head-and-neck cancer. *Nature Clinical Practice Oncology.* 2008; 5:24-31; Miralles-Guri C, Bruni L, Cubilla A L, Castellsague X, Bosch F X, de Sanjose S. Human papillomavirus prevalence and type distribution in penile carcinoma. *Journal of Clinical Pathology.* 2009; 62:870-878; Ramos C A, et al. Human papillomavirus type 16 E6/E7-specific cytotoxic T lymphocytes for adoptive immunotherapy of HPV-associated malignancies. *J Immunother.* 2013; 36:66-76; de Jong A, et al. Human papillomavirus type 16-positive cervical cancer is associated with impaired CD4$^+$ T cell immunity against early antigens E2 and E6. *Cancer research.* 2004; 64:5449-5455; Hoots B E, et al.; Human papillomavirus type distribution in anal cancer and anal intraepithelial lesions. *International Journal of Cancer.* 2009; 124:2375-2383 (each incorporated by reference).

Most donors for adoptive immunotherapy treatments are naïve to HPV antigens or naïve to protective HPV epitopes (e.g., they lack any or sufficient memory T cells that recognize HPV epitopes). In the United States, seroprevalence for any of the 9 HPV types is limited to approximately 40% for females and 20% for males; Liu G, et al., Seroprevalence of 9 Human Papillomavirus Types in the United States, 2005-2006. *The Journal of infectious diseases.* 2015 (incorporated by reference). Similarly, cord blood cells and other unprimed cells lack immunological memory. For example, when a recipient receives a cord blood transplant or infusion, the cord blood almost entirely contains naïve T cells that do not recognize HPV or other antigens and which cannot recognize or provide protection against HPV, other pathogens, or neoplastic cells. The difficulties associated with generating virus-specific T cells from naïve populations (e.g. healthy donors or donors sero-negative for the target antigen(s) of choice) arise from the need for priming naïve donor antigen-specific T cells including those in cord blood to epitopes that produce a protective cellular response to the virus, tumor, or another pathogen.

Infection with HPV can also perturb the host's immune system allowing HPV to evade protective mechanisms. HPV has been found to disturb multiple components of the antigen processing machinery, thereby directly interfering with the effective generation of CTL epitopes; Steinbach, A. et al., International J. Cancer, 142(2):224.

Existing methods for priming naïve T cells to produce memory T cells have not been successful, see McGoldrick, et al., "Cytomegalovirus-specific T cells are primed early after cord blood transplant but fail to control virus in vivo", Blood 121(14): 2796-2803 (Epub 2013). Moreover, developing immune systems of neonates have little immunological memory which increases their vulnerability to infectious agents, see Basha, et al., "Immune responses in neonates", Expert Rev. Clin. Immunol. 10(9):1171-1184 (2014).

When cord blood is used the amount of cord blood available is often limiting as cord blood units typically contain a total of 25 ml of blood. From this 25 ml, 20 mL typically goes directly to the patient as the transplant to repopulate the immune system, while only 5 ml is left for potential T cell expansion. The lack of memory cells in cord blood as well as the limited volume available has previously made ex vivo expansion procedures implausible for adoptive immunotherapy in a clinical setting.

An additional problem with many existing methods for expanding virus-specific and other antigen-specific T cells is the requirement for use of infectious viruses, virus-infected cells, or virus-transformed cells, such as Epstein-Barr virus-transformed lymphoblastoid cell lines, to produce antigen-specific T cells, Ngo, et al., Complementation of antigen-presenting cells to generate T lymphocytes with broad target specificity. *J Immunother.* 2014; 37:193-203. Such methods involve additional clinical risks and regulatory hurdles due to the use of potentially infectious agents; Hanley, P J, et al., *Science translational medicine.* 2015; 7:285ra263; Hanley, P J, et al., *JoVE.* 2012:e3627.

Peptide antigen-based methods have been proposed to avoid these risks. However, the application of these peptide-based methods towards generating HPV-specific T cells from naïve donors has met very limited success with most successful attempts using autologous cells from patients previously exposed to HPV or other antigens.

These problems highlight the need for the development of new procedures for generating the kinds and numbers of virus-, neoplasm- or other antigen-specific T cells needed for successful immunotherapy.

As disclosed herein, the inventors now provide a rapid and robust method for priming and expanding antigen-specific T cells to HPV, other pathogens, and cancer/tumor antigens. This method does not require the use of live virus or virus-transformed cells or other infectious agents which are often prohibited by the U.S. and international regulatory bodies. It can advantageously be practiced with donor cells naïve to one or more epitopes of interest and is suitable for producing antigen-specific T cells from a donor cell population suitable for storage in a cell bank and for later off-the-shelf use for treating partially or fully histocompatible recipients.

Given the problems associated with ex vivo priming and expansion of antigen-specific T cells, the inventors sought a new way to produce antigen-specific T cells for HPV and other viruses and pathogens. Such antigen-specific T cells once they are primed and expanded may be stored and maintained in a bank. Such a bank may contain autologous or allogeneic, third party antigen-specific T cells, which can later be matched and adoptively transferred to a recipient in need of the antigen-specific T cell immunity. Research studies have shown that adoptively transferred T cells having a single major HLA match can be sufficient to mediate the therapeutic efficacy of these T cells with minimal side effects.

BRIEF SUMMARY OF THE INVENTION

One aspect of the invention is directed to a robust method for generating T cells that specifically recognize particular antigens or epitopes. These antigens may be derived from viruses, such as human papillomavirus (HPV), other viruses, especially those associated with infection in immunocompromised subjects, bacteria, cancer or tumor cells, or other pathogens. The method usually or typically comprises (a) dividing mononuclear cells from a donor into a CD14-positive cell population and a CD14-negative cell population or into a plastic adherent and plastic non-adherent population; (b) culturing a first portion of the CD14-positive cell population or adherent population in a medium comprising granulocyte/macrophage-colony stimulating factor (GM-CSF) and interleukin 4 (IL-4) to produce a first population of dendritic cells; (c) culturing the first population of dendritic cells produced in (b) in a medium comprising peptides derived from at least one, two, three or more antigens of interest; (d) culturing the first population of dendritic cells from step (c) in a medium comprising interleukin 6 (IL-6). interleukin 1 beta (IL-1β). tumor necrosis factor alpha (TNF-α). prostaglandin E1 (PGE1L). prostaglandin E2 (PGE2). granulocyte-macrophage colony-stimulating factor (GM-CSF), interleukin 4 (IL-4) and lipopolysaccharide (LPS); (e) culturing the CD14-negative cell population or plastic non-adherent population from (a) with the first population of dendritic cells from (d) in a medium comprising interleukin 6 (IL-6), interleukin 7 (IL-7), interleukin 12 (IL-12 and interleukin 15 (IL-15) to produce an antigen-specific T cell population; (f) culturing the antigen-specific T cell population from step (e) with a second population of dendritic cells in a medium comprising IL-7 and IL-15, wherein the second population of dendritic cells are generated from a second portion of the CD-14 positive cell (or plastic adherent) population as provided in steps (b)-(d); (g) culturing the antigen-specific T cell population from step (f)

with a third population of dendritic cells in a medium comprising IL-2 and IL-15, wherein the third population of dendritic cells are generated from a third portion of the CD-14 positive cell (or plastic adherent) population as provided in steps (b)-(d); and, (h) recovering the antigen specific T cell population from (g).

In some embodiments, (e) or similar steps may be performed with a mixture of the IL-7, IL-12 and IL-15 or cytokines without IL-6; or IL-7 and IL15 without IL-6 or IL-12. In other embodiments, (e) may be performed with a mixture of IL-7, IL-12, IL-15 and at least one of the following cytokines: IL-2, IL-6, IL-15, interleukin 18 (IL-18) and interleukin 27 (IL-27).

The recovered antigen-specific cells may comprise a mixed phenotype of CD4+ and CD8+ T cells, and/or comprise CD27+ and CD28+ T cells. In a preferred embodiment, overlapping peptide libraries derived from one, two, three, or more HPV antigens or antigens or other pathogens are used in step (c).

For production of HPV-specific T cells, peptides or overlapping peptide libraries corresponding to one, two, three or more HPV antigens selected from the group consisting of HPV E1, E2, E3, E4, E5, E6, E7, L1, and L2 are used. Preferably, the method will use overlapping peptide libraries for one or both of the E6 and E7 antigens. Such libraries are commercially available or may be commercially produced based on known amino acid sequences of HPV antigens, for example, they may be obtained from JPT whose catalog is incorporated by reference to hypertext transfer protocol secure://www.jpt.com/products/pepmix-peptide-pools/(last accessed Jan. 8, 2021).

In other embodiments, this method is used to generate antigen-specific T cells that recognize bacterial, parasite, cancer, or prion antigens or epitopes using commercially available peptides or peptide libraries such as those available from JPT or using peptides or peptide libraries produced from known amino acid sequences of these pathogens.

In a preferred embodiment, the mononuclear cells in (a) comprise, consist essentially of, or consist of allogeneic or autologous cells that are naïve to the antigen or epitope of interest, for example, cells from a donor who has never been infected by HPV, or HPV-naïve cells derived from cord blood.

Human papillomavirus (HPV) causes cervical cancer, vulvar and vaginal cancers, anal cancer, certain head and neck cancers, such as throat and back of mouth cancers and genital warts as well as neonatal conjunctivitis. Adoptively transferred T cells produced as disclosed herein may be infused into or otherwise administered to a subject with such an HPV related disease, disorder, or condition. Such patients may include immunocompromised patients or hosts more susceptible to HPV infection. Immunocompromised hosts include those with infections affecting immune competency such as human immunodeficiency virus (HIV), and those on immunosuppressive and/or immunomodulatory treatment for autoimmune conditions (e.g. multiple sclerosis, inflammatory bowel disease, systemic lupus erythematosus (SLE)), or for prevention of graft rejection among those who are post-transplantation; see Garland, S. M. et al., Papillomavirus Research (2017), 4, 35-38 which is incorporated by reference. Typically the allogenic cells used to produce HPV-specific T cells share at least one major histocompatibility antigen with a subject to whom the result antigen-specific T cells are administered.

In another embodiment, the method produces antigen-specific effector T cells or memory T cells to a variety of pathogens including viral infections after hematopoietic stem cell transplantation or those associated with immunocompromised patients, such as infections by cytomegalovirus (CMV) (e.g., JPT pepmix library PM-C-HCMV-2, Epstein bar virus (EBV) (e.g., JPT pepmix library PM-C-EBV-2) and AdV (e.g., JPT pepmix library PM-HAdV3). Peptides and peptides are commercially available. All pepmix libraries available as of the filing date from JPT are hereby incorporated by reference to hypertext transfer protocol secure://www.jpt.com/products/pepmix-peptide-pools/.

In another embodiment, the antigen-specific T cells are used to treat infections by neonatal, congenital, and/or intrauterine pathogens including rubella, cytomegalovirus (CMV), parvovirus B19, varicella-zoster (VZV), enteroviruses, human immunodeficiency virus (HIV), human T cell leukemia virus 1 (HTLV-1), hepatitis B, hepatitis B, Lassa Fever, and Japanese Encephalitis. Perinatal and neonatal infections agents include Herpes Simplex Virus (including Human Herpes Simplex types 1 and 2), varicella zoster virus (VZV) VZV, Enteroviruses, HIV, Hepatitis B. Hepatitis C, and HTLV-1. Other pathogens include respiratory syncytial virus (RSV), metapneumovirus (hMPV), rhinovirus, parainfluenza (PIV), and human coronavirus, norovirus, Herpes simplex virus (HSV), Zika virus, and encephalitis viruses.

Another aspect of the invention is directed to the antigen-specific T cells and their progeny produced by the methods disclosed herein.

In a preferred embodiment, these antigen-specific T cells will comprise a mixed phenotype of CD4+ and CD9+ T cells and/or comprise an antigen-specific T cell population containing CD27+ and CD28+ T cells. These antigen-specific T cells may also form part of a cryogenically preserved composition that has been deposited in a bank containing a variety of different indexed antigen-specific T cells.

They may also form a viable part of a composition suitable for adoptive transfer of the antigen-specific T cells to a subject in need of them, for example, for transfer into a subject infected by HPV or another pathogen.

Another aspect of the invention involves a method for treating a subject by administering or adoptively transferring antigen-specific T cells produced as disclosed herein into a subject in need thereof. Such a method will be practiced by administering T cells that recognize a target antigen of interest such as an HPV or other viral antigen expressed or presented by infected host cells, a tumor or cancer antigen or epitope, or antigens or epitopes of other pathogens.

Preferably these antigen-specific T cells are administered to a subject matched for at least one HLA allele to those of the antigen-specific T cells.

Another aspect of the invention is a bank of T cells that recognize particular antigens. Each deposit of antigen-specific T cells in the bank may be classified according to antigen-specificity of the T cells, specify the HLA background of the deposited cells, as well as the source of the cells used to produce the antigen-specific T cells. Such a bank provides a convenient off-the-shelf selection for rapid administration of antigen-specific T cells to a subject in need thereof.

A more complete appreciation of the disclosure and many of the attendant advantages thereof will be readily obtained as the same becomes better understood by reference to the following detailed description when considered in connection with the accompanying drawings below.

DETAILED DESCRIPTION OF THE PREFERRED EMBODIMENTS

Figure 1:
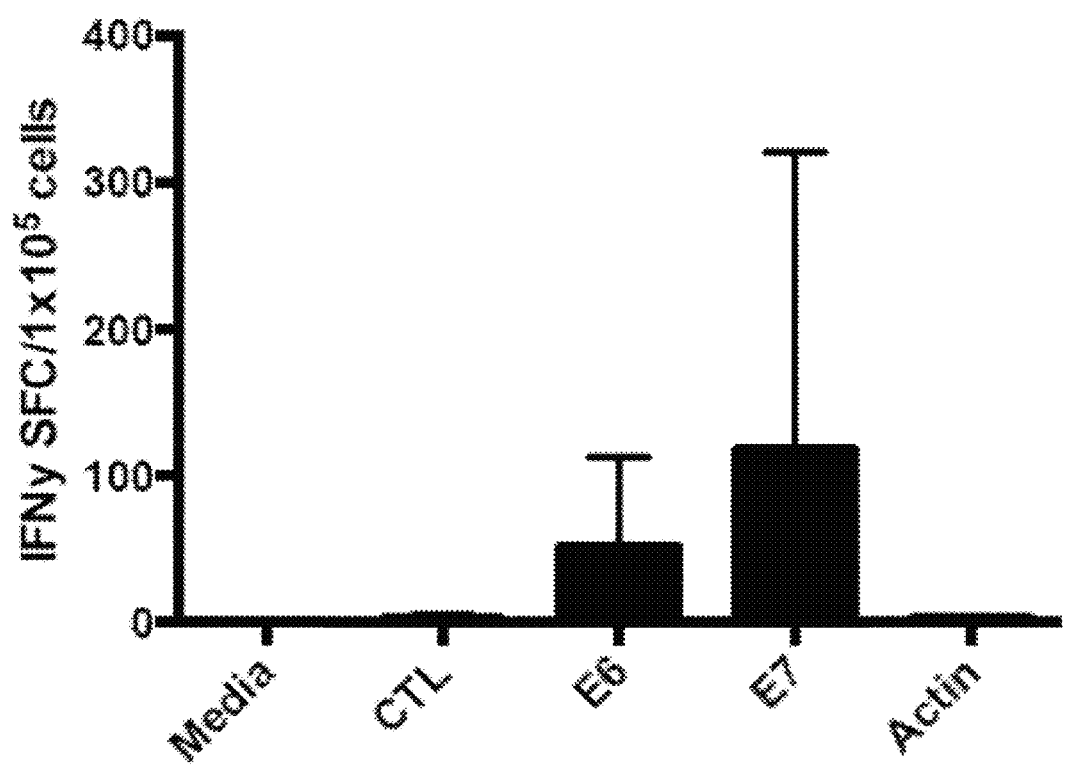
FIG. 1. T cells that recognize HPV were generated from cells from healthy donors (n=5) using the method disclosed in Example 2. They specifically recognize HPV antigens E6 and E7 as compared to an irrelevant antigen (the self-protein actin). Interferon-gamma (IFNγ) spot forming cells (SFC) are indicated. Background responses from cells alone (CTL) are shown. This shows that the process of the invention generates HPV-specific T cells from healthy donors.

The method according to the invention advantageously permits the rapid and robust expansion of HPV-recognizing or HPV-specific T cells, provides T cells which recognize therapeutically important antigens targeting opportunistic HPV infections and HPV-associated malignancies, and does not require the use of live viruses or virus-transformed cells. The inventors describe a new way of manufacturing HPV-specific T cells in a clinically-appliable way for use as a donor-derived and off-the-shelf product by building on their experience in producing T cell responses ex vivo and knowledge of the immunological properties of HPV. It was found that by produce antigen-presenting dendritic cells, modifying the concentrations of cytokines used to expand T cells, and employing other antigen-presenting cells such as activated T cells (ATCs) or artificial antigen-presenting T cells, that HPV-specific T cells could be rapidly and robustly produced.

The generated HPV-specific T cell populations can recognize a single epitope of an HPV antigen, multiple epitopes of a single HPV antigen, or epitopes on different HPV antigens. In a preferred embodiment, the method employs overlapping peptide libraries of HPV antigen(s) pulsed onto different types of antigen presenting cells, such as dendritic cells, monocytes, K562 cells, artificial antigen presenting cells, PHA blasts, B-blasts, lymphoblastoid cells, CD3-28 blasts or other types of antigen-presenting cells. Also, compared to prior methods it uses different mixtures of cytokines to prime and expand T cells. These cytokines include, but not limited to IL2, IL7, IL15. It also involves different selection methods including CD45RO depletion.

The antigen-specific T cells produced as disclosed herein can be used to treat post-transplant viral infections and tumor relapses when a patient's cellular immune system is deficient in antigen-specific T cells that recognize the corresponding viral or tumor antigens or epitopes.

The disclosed methods can be readily applied to generating antigen-specific responses from naïve populations against opportunistic viruses other than HPV, such as, but not limited to BK virus, CMV, EBV, HHV6 or HIV.

These antigen-specific T cells and their precursors can be advantageously banked or stored and classified for HLA alleles for later administration to a partially or fully histocompatible subject in need of T-cell immunity against a particular pathogen or neoplastic condition. HPV or other antigen-specific T cells can be generated from the immune systems of healthy donors, for example, HPV-specific T cells may be produced from PBMCs of HPV seronegative donors.

The invention generates HPV-specific T cells using different overlapping peptide libraries pulsed onto different kinds of antigen presenting cells (e.g., dendritic cells, monocytes, K562 cells, PHA blasts, B-blasts, lymphoblastoid cells, and CD3-28 blasts), different priming and expansion cytokines (including but not limited to IL2, IL7, IL15), and different selection methods (CD45RO depletion, etc). Other artificial or alternative antigen presenting cells may be used as well. The inventors also describe a third party bank of the said cells manufactured from naïve T cells, along with the process of selecting the best match for a donor.

The process of the present invention is safe, simple, rapid and reproducible and can be used to produce HPV-recognizing or HPV-specific T cells in accordance with good manufacturing practices (GMP) for a variety of different patients. The antigen-specific T cells produced by the disclosed methods can be used to prevent or treat viral infections, such as those in an immunosuppressed patient occurring after a tissue transplant. They may also be used to treat other immunocompromised or immunodeficient patients, such as those infected by HPV or those having HPV-associated malignancies. The process as disclosed herein makes multi-HPV-antigen-specific T cells from naïve T cells in a clinically-relevant way that has never been done before from naïve T cells.

The antigen-specific T cells disclosed herein may be combined with other cell products, lymphodepleting regimens, or epigenetic-modifying drugs. Other medical uses include providing therapy to immunodeficient patients before a transplant and promoting engraftment of a tissue, for example, by removing recipient-reactive T cells and replacing a patient's T cell population with one expanded ex vivo which recognizes specific pathogen-associated antigens.

In some of its embodiments, the invention provides a robust method for generating T-cells that specifically recognize particular antigens, such as those derived from viruses, other pathogens, or tumors. The invention can generate a population of T-cells that recognizes different or multiple epitopes of a pathgen providing a broader spectrum of cellular immunity. For example, to produce a broad cellular immune response, naïve cell populations can be exposed to antigen-presenting cells pulsed with and presenting overlapping peptides representing one or more antigens of a particular pathogen, such as HPV. These peptides may be pulsed onto different antigen presenting cells, such as dendritic cells, monocytes, K562 cells, PHA blasts, B-blasts, lymphoblastoid cells, or CD3-28 blasts, and the method may employ different priming and expansion cytokines (including but not limited to IL2, IL7, IL15), and different selection methods (CD45RO depletion, etc).

The virus- or other antigen-specific T-cells produced by such methods can be used to treat post-transplant viral infections, infections by non-viral parthogens or tumor relapse in a subject receiving a transplant of naïve cord blood, stem or other donor cells. Moreover, the antigen-specific T-cells can be advantageously banked or stored for later administration to a subject in need of treatment, for example, in need of T-cells that recognize a particular virus or tumor.

In another embodiment, the invention provides antigen-specific T-cells, including populations of antigen-specific T-cells that recognize multiple determinants of an antigen, that can be used to boost or supplement the immune system of other subjects, including those not receiving naïve cell transplants such as cord blood or naïve hematological cells, when needed. Examples of such subjects include those receiving organ transplants, those undergoing immune system ablation, and those who are immunosuppressed or immunocompromised, such as those infected with opportunistic infections.

The invention makes multi-virus-antigen-specific T cells from naïve T cells in a clinically-relevant way that has never be done before from naïve T cells. In some embodiments, the invention itself is a process and use which can readily applied to other opportunistic viruses such as, but not limited to, HHV6 and BK viruses. It can be expanded to include virus-specific antigens from diseases associated with malignancies such as, but not limited to, those caused by or associated with EBV and HIV. Other medical uses include promoting engraftment and providing a therapy to immunodeficient patients before a transplant.

Without limitation, embodiments of the invention can be combined with other therapies, such as cellular products, lymphodepleting regimens, epigenetic-modifying drugs, or other antimicrobial or antitumor therapies.

In some embodiments the invention generates antigen-specific T cells using different overlapping peptide libraries pulsed onto different antigen presenting cells (dendritic cells, monocytes, K562 cells, PHA blasts, B-blasts, lymphoblastoid cells, and CD3-CD28 blasts), different priming and expansion cytokines (including but not limited to IL2, IL7, IL15), and different selection methods (CD45RO depletion, etc). These cells are used to treat post-transplant viral or other microbial infections.

In another embodiment the invention involves third party banking of antigen-specific T-cells manufactured from naïve T cells along with processes for selecting the best donor:recipient match.

Other advantageous features of many embodiments of the process according to the invention include that they employ simple, repeatable steps that comply with good manufacturing practices. It is not necessary to perform multiple, complex and potentially unrepeatable or non-standardizable steps. The process of the invention is safe, simple, rapid and reproducible and can be used to produce virus- and other antigen-specific T-cells for a variety of different patients.

The process according to the invention is broad in scope in that it can target different patients receiving different transplants, such as cord blood, stem cells or other naïve donor cells. For example, it is the only process that produces virus- and other antigen-specific T-cells for patients undergoing a cord blood transplant where the same cord blood unit is used for the transplant and also used to manufacture the virus and other antigen-specific T-cells that protect the patient from opportunistic infections.

Embodiments

Specific non-limited embodiments of the invention include the following:

The process according to the present invention is broad in scope. For example, it can be used to prevent conditions associated with HPV post allogeneic stem cell transplant, or it can be used to prevent relapse of HPV malignancies like cervical carcinoma. Specific non-limited embodiments of the invention are now further described.

In one embodiment, the invention comprises a process for producing an HPV antigen-specific T cell comprising (a) dividing mononuclear cells from any cell source containing naïve immune cells into several portions; (b) stimulating a portion of said sample with PHA or another mitogen and with IL-2 to produce ATCs activated T cells ("ATCs") that serve antigen presenting functions during subsequent stimulations and optionally treating the ATCs with radiation or another agent to inhibit their outgrowth; (c) separating T cells and T cell precursor cells (e.g., non-adherent cells, $CD3^+$ cells, $CD14^-$ cells) from dendritic cells and dendritic precursor cells (e.g., adherent cells, $CD11C^+$ or $CD14^+$ cells); (d) cryopreserving or otherwise reserving the T cells and T cell precursor cells; (e) differentiating the dendritic cells and dendritic precursor cells in the second portion with cytokine(s) or other agent(s) that generate and mature dendritic cells and with at least one HPV peptide antigen or HPV antigen mix to produce antigen-presenting dendritic cells that present at least one HPV peptide antigen, and optionally treating said antigen-presenting dendritic cells with radiation or another agent sufficient to inhibit their outgrowth; (f) stimulating the cryopreserved or otherwise reserved T cells and T cell precursor cells from (d) with the dendritic antigen-presenting cells produced in (e) in the presence of any combination or all of IL-6, IL-7, IL-12 and IL-15 to produce antigen-specific T cells that recognize the at least one HPV peptide antigen; (g) stimulating antigen-specific T cells produced by (f) with the ATCs of (b) in the presence of the at least one HPV peptide antigen, optionally, in the presence of potentially artificial or alternative antigen presenting cells or other accessory cells in the presence of IL-2 and/or IL-15; optionally, repeating (g) one or more times; and (h) recovering antigen-specific T cells that recognize at least one peptide antigen.

Typically cells, such as PBMCs, stem cells, or cord blood cells, from a donor will match at least 1, 2, 3, 4, 5, 6, 7, or 8 HLA alleles of a recipient. Thus, banked antigen-specific T cells can be labelled with the HLA background of the donor cells so that an appropriate match may be made to the HLA background of a recipient.

T cells the recognize HPV antigens may be further isolated or purified based on cell surface markers. T cell phenotypes include cells with one or more of the following markers: CD4+, CD8+, CD4+/CD25+, CD45RO+, CD27+, CD28+, and/or PD1. T cell phenotypes include CD4+CD8+; CD27+CD28+ and CD4+, CD45RO+ and CD27+. Cells with undesired phenotypes may be removed or separated from desired HPV recognizing T cells using methods known in the art.

In methods according to the invention it is unnecessary to use viable virus to generate T cells recognizing HPV antigens. In the Examples above no strains of HPV or any live virus were used to produce any of the T cells. The antigens were from JPT: the E6 and E7 antigens were used. Nevertheless, the methods described herein can be practiced with HPV antigens from other sources such as virus infected cell-lysate, whole virus proteins, and plasmids or DNA sequences or viral vectors encoding the HPV antigen.

The process as described in the embodiment above may further comprise separating mononuclear cells containing naïve T cells prior to (a). The mononuclear cells used in this process may be obtained from cord blood, from stem cells, or from other sources of cells naïve to HPV antigens or naïve to particular HPV strains or particular HPV antigens. Thus, the mononuclear cells used in this process may be obtained from hematopoietic stem cells naïve to the at least one HPV peptide antigen; or from a sample containing stem cells, precursor T cells, or T cells from a subject whose immune system is naïve to the at least one HPV peptide antigen.

A process according to the invention may comprise (b) stimulating a first portion of said sample with PHA and with and IL-2 to produce activated T cells ("ATCs"). These ATCs may be cryopreserved or otherwise banked for later use or may be used immediately. Preferably, the ATCs are used fresh and mixed in with antigen-specific T cells produced in (f) without the need to cryopreserve either the ATCs or the antigen-specific T cells. For example, PHA blasts prepared in (b) can be used 14-16 days after initiation of the process to provide a second stimulation to the antigen-specific T cells produced in (f).

While those skilled in the art may select a suitable number of cells for use in a process according to the invention, such a process may comprise stimulating about 1 to 20 million, preferably 5-15 million, most preferably about 8-12 million, mononuclear cord blood cells with PHA and IL-2 in (b). Those of skill in the art may adjust the numbers of cells or other process conditions as necessary to scale up or scale down the process producing T cells recognizing HPV peptide antigens. In a process according to the invention, (b) may comprise producing T-blasts, B-blasts, lymphoblastoid cells, or CD3-CD28 blasts instead of PHA blasts as activated T cells.

Such a process may use T cells and/or T cell precursor cells that are separated from dendritic cells and dendritic precursor cells by culturing the second portion via plastic adherence under conditions sufficient for cells in the second portion to adhere to the cell culture plate or device and then removing T cells and T cell precursor cells from the cell culture plate or device and recovering the dendritic cells and dendritic precursor cells attached to the solid medium. Alternatively, these two populations of cells may be separated magnetically, by the use of antibodies that specifically recognize each population, by CD14-based selection (e.g., using MAC beads) or by other known methods of cell sorting. The separate populations of cells may be cryopreserved or otherwise banked for later use, or may be used immediately to produce T cells or dendritic cells. These populations may also be cryopreserved or otherwise banked after subsequent treatment steps described herein that produce mature dendritic cells loaded with peptide antigens or antigen-specific T cells.

In a process of the invention in (e) the dendritic cells and dendritic precursor cells can be grown in the presence of cytokines necessary for differentiation and maintenance of dendritic cells, including but not limited to IL-4 and GM-CSF; and in (e) the dendritic cells and dendritic precursor cells may be allowed to undergo maturation with a dendritic cell-maturing cytokine or agent selected from the group consisting of, but not limited to, one or more of the following LPS, TNF-alpha, IL-1 beta, IL-6, PGE-1, PGE-2, and other immune adjuvants (e.g. oligonucleotides), along with IL-4 and GM-CSF.

In some embodiments of the methods disclosed herein, in (f) or prior to (f) the T cells or T cell precursor cells may be treated to expand CD45RA positive cells; or in or prior to, (f) the T cells and T cell precursors may be treated to deplete CD45RO positive cells. Other T cells with particular markers may be treated to expand or deplete HPV-recognizing T cells having particular cell surface phenotypes, such as any of those phenotypes described herein.

In a method according to the invention, the at least one antigen may comprise a series of overlapping peptides spanning an entire HPV protein or HPV antigen (or antigens of other pathogens or cancers).

In some embodiments the antigen-specific T cells may be selected to recognize at least one antigen of an opportunistic HPV that was acquired nosocomially or iatrogenically or that is transmitted to a subject in a hospital (e.g., a hospital acquired infection) or by a particular mode of infection, such as by direct contact with a mucous membrane, skin, or through sexual contact. The at least one peptide antigen may comprise a HPV antigen or peptide library, such as an HPV E1-E5 antigen or peptide library; an HPV E6 or E7 antigen or peptide library; an HPV L1 or L2 antigen or peptide library; or mixtures thereof.

The at least one peptide antigen may be one recognized by a T cell isolated from a site, tissue or cell infected with HPV.

Another embodiment of the invention is directed to a composition comprising antigen-specific T cells produced by a method disclosed herein. Such antigen specific T cells may recognize one, two, three, four, five or more HPV strains, serotypes, antigens or epitopes. Such a composition may comprise mononuclear cells isolated from different cell sources, which preferably mostly comprise but are not limited to samples containing naïve immune cells, antigen presenting cells derived from these same sources, such as dendritic cells, PHA blasts which contain in them PHA or another mitogen, IL-2, and a medium that maintains the viability of said cells, and, optionally, K562 cells or other non-autologous cells, including artificial or alternative antigen presenting cells, that costimulate T cells, wherein, optionally, said cells have been treated to prevent outgrowth.

In another embodiment the composition comprises T cells and T cell precursor cells (e.g., non-adherent cells, $CD3^+$ cells, $CD14^-$ cells) that have been separated from dendritic cells and dendritic precursor cells (e.g., adherent cells, $CD11C^+$ or $CD14^+$ cells) and that are naïve to at least one, preferably, all HPV peptide antigens; cytokines including but not limited to at least one of IL-2, IL-6, IL-7, IL-12, and IL-15, at various points in the culture period; and a medium that maintains the viability of said T cells and T cell precursor cells.

Other embodiments of the invention include a bank or cell storage facility which methods disclosed herein in combination with a storage or freezing medium; wherein said one or more samples is optionally associated, identified or indexed by information describing its source, including full or partial DNA sequence information, information describing its histocompatibility, including major and/or minor histocompatibility antigens or markers, and/or information about the peptide antigens it contains or recognizes. Such an antigen-specific T cell bank may comprise multiple samples of cryo- or otherwise preserved viable HPV antigen-specific T cells produced by methods disclosed herein.

Another embodiment of the invention constitutes a kit comprising T cells and T cell precursor cells (e.g., non-adherent cells, $CD3^+$ cells, $CD14^-$ cells) that have been separated from dendritic cells and dendritic precursor cells (e.g., adherent cells, $CD11C^+$ or $CD14^+$ cells) and that are naïve to an HPV peptide antigen; cytokines including but not limited to at least one of IL-2, IL-6, IL-7, IL-12, and IL-15; a medium that maintains the viability of said T cells and T cell precursor cells; dendritic or dendritic precursor cells that have been separated from said T cells and T cell precursor cells; a medium that maintains the viability of said dendritic or dendritic precursor cells; K562 cells, artificial or alternative antigen presenting cells, other non-autologous cells that costimulate T cells, optionally treated to prevent outgrowth, and at least one HPV peptide antigen or mixture of HPV peptides.

Other specific non-limited embodiments of the invention include the following:

A first embodiment is directed to a method or process for producing a virus-specific or other antigen-specific T cell comprising:
 (a) dividing mononuclear cells from a cord blood sample or other sample containing naïve immune cells into two portions;
 (b) contacting a first portion of said sample with PHA or another mitogen and/or with IL-2 to produce ATCs ("activated T cells") and treating the ATCs with radiation or another agent to inhibit their outgrowth;
 (c) separating T cells and T cell precursor cells (e.g., nonadherent cells, $CD3^+$ cells) from dendritic cells and dendritic precursor cells (e.g., adherent cells, $CD11C^+$ or $CD14^+$ cells);
 (d) cryopreserving or otherwise reserving the non-adherent cells;
 (e) contacting the adherent cells in the second portion with cytokine(s) or other agent(s) that generate and mature dendritic cells and with at least one virus or other peptide antigen to produce antigen-presenting dendritic cells that present at least one peptide antigen, and treating said antigen-presenting dendritic cells with radiation or another agent sufficient to inhibit their outgrowth;
 (f) contacting the cryopreserved or otherwise reserved non-adherent cells from (d) with the dendritic antigen-presenting cells produced in (e) in the presence of IL-7 and IL-15 to produce virus- or other antigen-specific T cells that recognize the at least one virus antigen or other peptide antigen;
 (g) contacting virus or other antigen-specific T cells produced by (f) with the ATCs of (b) in the presence of the at least one peptide antigen, optionally, in the presence of K562 cells or other accessory cells and in the presence of IL-15; optionally, repeating (g) one or more times;
 (h) recovering virus-specific or other antigen-specific T cells that recognize the at least one virus or other peptide antigen; and
 (i) optionally, administering said antigen-specific T cells to a subject in need thereof or banking or storing said antigen-specific T cells. In a preferred embodiment, the subject or recipient of the antigen-specific T cells will share at least one major histocompatibility allele with the antigen-specific T cells and with the donor cells from which they are derived.

A second embodiment of the method described above may further comprise separating mononuclear cells from cord blood or another sample containing naïve T cells prior to (a) in the first embodiment.

Additionally or alternatively, particular types of mononuclear cells may be recovered or removed. These include helper T cells (CD4), CD4 TREGS cells (e.g. $CTLA-4^+$ $GITR^+ PD-1^+ CCR^+ CCR4^+ CXCR4^+ GITR^+ LAG3^+ OX40^+$ ICOS), cytotoxic T cells (CD8), CD8 mucosal associated invariant T cells (Rearranged TCRβ chains with Vβ gene segments), CD8 memory T cells (e.g., $CD45RO^{hi}$ and $CD95^+ CD45RO^{low}$ subsets), B cells, or gamma/delta T cells markers. Other T cell phenotypes include cells with one or more of the following markers: CD4+, CD8+, CD4+/CD25+, CD45RO+, CD27+, CD28+, and/or PD1. T cell phenotypes include CD4+CD8+; CD27+CD28+ and CD4+, CD45RO+ and CD27+. Isolation or removal may be performed using cell sorting or by antibody-based removal or ablation of cells bearing particular markers. Human naïve $CD4^+$ T cells express CD45RA, CCR7, CD62L, and CD27 and may be enriched or recovered using these markers. Antibodies recognizing T and B cell markers are commercially available and incorporated by reference to MATER METHODS 2016; 6:1502/.

A third embodiment comprises the first or second embodiments, wherein the mononuclear cells are obtained from cord blood.

A fourth embodiment comprises the first, second, or third embodiments, wherein the mononuclear cells are obtained from stem cells naïve to the at least one peptide antigen.

A fifth embodiment comprises the first, second, third or fourth embodiments, wherein the mononuclear cells are obtained from a sample containing stem cells, precursor T cells, or T cells from a subject whose immune system is naïve to the at least one peptide antigen.

A sixth embodiment comprises the first, second, third, fourth or fifth embodiments, wherein (b) comprises contacting a first portion of said sample with PHA and with IL-2 to produce ATCs ("activated T cells").

These ATCs may be cryopreserved, stored in a culture medium or other liquid medium, or otherwise viably preserved for immediate or later use. Preferably, the ATCs are used fresh and mixed in with virus- or other antigen-specific T cells produced in (f) without the need to cryopreserve either the ATCs or the virus- or other antigen-specific T cells. For example, PHA blasts prepared in (b) can be used 14-16 days after initiation of the process to provide a second stimulation to the virus or other antigen-specific T cells produced in (f).

A seventh embodiment comprises the first, second, third, fourth, fifth or sixth embodiments, wherein (b) comprises contacting about 1, 5, 10, 15, to 20 million, preferably 5-15 million, most preferably about 8, 9, 10, 11 or 12 million, mononuclear cord blood cells with PHA and IL-2.

An eighth embodiment comprises the first, second, third, fourth, fifth, sixth, or seventh embodiments, wherein (b) comprises producing T-blasts, B-blasts, lymphoblastoid cells, or CD3-CD28 blasts.

A ninth embodiment comprises the first, second, third, fourth, fifth, sixth, seventh, or eighth embodiments, wherein T cells and T cell precursor cells are separated from dendritic cells and dendritic precursor cells by contacting the second portion with a solid medium or plastic substrate for a time and under conditions sufficient for cells in the second portion to adhere to the solid medium or plastic substrate and then removing T cells and T cell precursor cells from the solid medium or plastic substrate and recovering the dendritic cells and dendritic precursor cells attached to the solid medium or plastic substrate.

Alternatively, these two populations of cells may be separated magnetically, by the use of antibodies or other ligands that specifically recognize each population, or by other known methods of cell sorting.

The separate populations of cells may be cryopreserved or otherwise viably saved or banked for later use, or may be used immediately to produce T cells or dendritic cells.

These populations may also be cryopreserved or otherwise viably banked after subsequent treatment steps described herein that produce mature dendritic cells loaded with virus or other peptide antigens or virus-specific or other antigen-specific T cells.

A tenth embodiment comprises the first, second, third, fourth, fifth, sixth, seventh, eighth, or ninth embodiments, wherein in (e) the dendritic cells and dendritic precursor cells are contacted with at least one dendritic cell-generating cytokine selected from the group consisting of IL-4 and GM-CSF.

An eleventh embodiment comprises the first, second, third, fourth, fifth, sixth, seventh, eighth, ninth, or tenth embodiments wherein in (e) the dendritic cells and dendritic precursor cells are contacted with a dendritic cell-maturing cytokine or agent selected from the group consisting of LPS, TNF-alpha, IL-1 beta, IL-6, PGE-1 and PGE-2; along with IL-4 and GM-CSF.

A twelfth embodiment comprises the first, second, third, fourth, fifth, sixth, seventh, eighth, ninth, tenth, or eleventh embodiments, wherein in or prior to (f) the dendritic cells and dendritic precursor cells are treated to expand CD45RA positive cells.

A thirteenth embodiment comprises the first, second, third, fourth, fifth, sixth, seventh, eighth, ninth, tenth, eleventh, or twelfth embodiments, wherein in or prior to (f) the dendritic cells and dendritic precursor cells are treated to deplete CD45RO positive cells.

A fourteenth embodiment comprises the first, second, third, fourth, fifth, sixth, seventh, eighth, ninth, tenth, eleventh, twelfth, or thirteenth embodiments, wherein said at least one virus- or other antigen-specific peptide antigen comprises a series of overlapping peptides.

A fifteenth embodiment comprises the first, second, third, fourth, fifth, sixth, seventh, eighth, ninth, tenth, eleventh, twelfth, thirteenth, or fourteenth embodiments, wherein said at least one virus- or other peptide antigen comprises a tumor-associated or tumor-specific antigen.

A sixteenth embodiment comprises the first, second, third, fourth, fifth, sixth, seventh, eighth, ninth, tenth, eleventh, twelfth, thirteenth, fourteenth, or fifteenth embodiments, wherein said at least one peptide antigen comprises a determinant of a tumor-associated or tumor-specific antigen selected from the group consisting of PRAME, NYESO, MAGE A4, MAGE A3, MAGE A1, Survivin, WT1, neuroelastase, proteinase 3, p53, CEA, claudin6, Histone H1, Histone H2, Histone H3, Histone H4, MART1, gp100, PSA, SOX2, SSX2, Nanog, Oct4, Myc, and Ras.

A seventeenth embodiment comprises the first, second, third, fourth, fifth, sixth, seventh, eighth, ninth, tenth, eleventh, twelfth, thirteenth, fourteenth, or fifteenth embodiments, wherein said at least one peptide antigen comprises a determinant of a tumor-associated or tumor-specific antigen selected from the group consisting of PRAME, Survivin, and WT1.

Preferably, to counteract immune evasion by cancer cells, which can down-regulate or mutate cancer antigens they express, T cells may be produced to 2, 3, 4 or more different tumor antigens or different epitopes on the same or different tumor antigen.

An eighteenth embodiment comprises the first, second, third, fourth, fifth, sixth, seventh, eighth, ninth, tenth, eleventh, twelfth, thirteenth, fourteenth, or fifteenth embodiments, wherein said at least one peptide antigen comprises a determinant of a virus including MHC-1 or MHC-II restricted virus-derived or associated peptides. Such viruses include opportunistic pathogens such as those described herein, emerging viral pathogens such as Zika virus, SARS-COV-1, SARS-COV-2 or MERS-COV, as well as other viruses associated with disease.

A nineteenth embodiment comprises the first, second, third, fourth, fifth, sixth, seventh, eighth, ninth, tenth, eleventh, twelfth, thirteenth, fourteenth, fifteenth, sixteenth, seventeenth, or eighteenth embodiments, wherein said at least one peptide antigen comprises a determinant of a filovirus, such as a determinant of GP, NP, VP40, VP35, VP30, or VP24 from Ebola virus.

A twentieth embodiment comprises the first, second, third, fourth, fifth, sixth, seventh, eighth, ninth, tenth, eleventh, twelfth, thirteenth, fourteenth, fifteenth, sixteenth, or seventeenth, eighteenth embodiments, or nineteenth wherein said at least one peptide antigen comprises a determinant of a measles virus, such as a determinant of antigen P, V, C, M, N, F, P, or L.

A twenty first embodiment comprises the first, second, third, fourth, fifth, sixth, seventh, eighth, ninth, tenth, eleventh, twelfth, thirteenth, fourteenth, fifteenth, sixteenth, seventeenth, eighteenth, nineteenth, or twentieth embodiments, wherein said at least one peptide antigen is a series of overlapping peptides representing a viral antigen from an opportunistic viral pathogen, from a neonatal congenital or intrauterine pathogen, such as Rubella, Cytomegalovirus (CMV), Parvovirus B19, Varicella-Zoster (VZV), Enteroviruses, HIV, HTLV-1, Hepatitis C, Hepatitis B, Lassa Fever, and Japanese Encephalitis; or from a perinatal or neonatal pathogen such as Human Herpes Simplex, VZV, Enteroviruses, HIV, Hepatitis B, Hepatitis C, HTLV-1, Zika virus or an encephalitis virus.

A twenty second embodiment comprises any one of embodiments 1-21, wherein said at least one virus peptide antigen is a series of overlapping peptides representing or constituting overlapping fragments of all or part of a CMV antigen.

A twenty third embodiment comprises any one of embodiments 1-22, wherein said at least one virus or other peptide antigen is a series of overlapping peptides representing or constituting overlapping fragments of an Epstein Barr virus (EBV) antigen or an adenovirus antigen.

A twenty fourth embodiment comprises any one of embodiments 1-23, wherein said at least one virus peptide antigen comprises peptides or series of overlapping peptides from multiple viral antigens of opportunistic or emergent viral pathogens.

A twenty fifth embodiment comprises any one of embodiments 1-24, wherein said at least one peptide antigen comprises a determinant of a bacterial antigen.

A twenty sixth embodiment comprises any one of embodiments 1-25, wherein said at least one peptide antigen comprises a determinant of a mycobacterium, such as a determinant of ESAT6, HLPMt, PPE5, MVA85A, AG85, PSTS1, ACR, HSP65, GroES, EsxA, EsxB, or MPB70 from *Mycobacterium tuberculosis*.

A twenty seventh embodiment comprises any one of embodiments 1-26, wherein said at least one peptide antigen comprises a determinant of a fungal, parasitic, or other eukaryotic pathogen.

A twenty eight embodiment is directed to any one of embodiments 1-27, wherein said at least one peptide antigen comprises a mammalian histocompatibility antigen or other mammalian antigen.

A twenty ninth embodiment is directed to any one of embodiments 1-28, wherein in (f) the non-adherent cells from (d) are contacted with the dendritic antigen-presenting cells made in (e) at a ratio (d):(e) ranging from 1:1 to 200:1, preferably at a ratio ranging from 5:1 to 100:1, and most preferably at a ratio of about 5:1 to 20:1.

A thirtieth embodiment is directed to any one embodiments 1-29, wherein (g) further comprises contacting said virus- or antigen-specific T cells with K562 cells, modified HLA-negative, K562cs cells that express CD80, CD83, CD86, and/or 4-1BBL, or other accessory cells.

A thirty first embodiment is directed to any one of embodiments 1-30, wherein (g) comprises contacting said T cells produced in (f) with ATCs and K568 cells at a ratio of T cell to ATC ranging from 10:1 to 1:1, preferably ranging from 5:1 to 2:1, and most preferably at a ratio of about 4:1, or any intermediate ratio thereof.

A thirty second embodiment is directed to any one of embodiments 1-31, further comprising repeating (g) with the virus- or antigen-specific T cells recovered in (h) in the presence of IL-2.

A thirty third embodiment is directed to a composition comprising virus- or other antigen-specific T cells produced by the process of any one of embodiments 1-32.

A thirty fourth embodiment is directed to virus- or other antigen-specific T cell bank comprising multiple samples of cryopreserved or otherwise preserved viable virus- or other antigen-specific T cells produced by the process of any one of embodiments 1-32.

A thirty fifth embodiment is directed to a method of treatment comprising administering virus- or other antigen-specific T cells produced by the process of any one of embodiments 1-32 to a subject in need thereof.

A thirty sixth embodiment is directed to the embodiment 35, wherein said subject is partially histocompatible with the virus- or other antigen-specific T cells.

A thirty seventh embodiment is directed to embodiment 35, wherein said subject is fully histocompatible with the virus- or other antigen-specific T cells.

A thirty eight embodiment is directed to any one of embodiments 35-37, wherein the subject's immune system has been reconstituted with the same cord blood cells or same naïve immune cells used to produce the virus- or other antigen-specific T cells.

A thirty ninth embodiment is directed to any one of embodiments 35-38, wherein the subject is immunocompromised.

A fortieth embodiment is directed to any one of embodiments 35-39, wherein the subject's immune system has been ablated or lymphocyte depleted, for example by radiation, chemotherapy, infection, or immunosuppression.

A forty first embodiment is directed to any one of embodiments 35-40, wherein the subject has received an allograft or other transplant.

A forty second embodiment is directed to any one of embodiments 35-41, wherein the subject's immune system is naïve to the antigen recognized by the virus- or other antigen-specific T cells produced.

A forty third embodiment is directed to any one of embodiments 35-42, wherein the virus- or other antigen-specific T cells recognize cytomegalovirus antigen(s) or antigenic determinants thereof or wherein the virus- or other antigen-specific T cells recognize Epstein Barr virus antigen(s) or antigenic determinants thereof.

A forty fourth embodiment is directed to any one of embodiments 35-43, wherein the virus- or other antigen-specific T cells recognize adenovirus antigen(s) or antigenic determinants.

A forty fifth embodiment is directed to any one of embodiments 35-44, wherein the virus- or other antigen-specific T cells recognize multiple antigens or antigenic determinants of one or more opportunistic viral pathogen(s).

A forty sixth embodiment is directed to any one of embodiments 35-45, wherein the virus-specific T cells recognize at least one virus antigen of an opportunistic viral pathogen selected from the group consisting of CMV, adenovirus, BK virus, Human Herpes Virus-6 (HHV6) or other herpes viruses, influenza, respiratory syncytial virus, parainfluenza virus, and Varicella Zoster virus.

A forty seventh embodiment is directed to any one of embodiments 35-46, wherein the virus- or other antigen-specific T cells recognize at least one antigen of an opportunistic viral pathogen that is acquired nosocomially or iatrogenically or that is transmitted to a subject in a hospital (e.g., a hospital acquired infection).

A forty eight embodiment is directed to a composition comprising mononuclear cells isolated from cord blood or from another sample containing naïve immune cells, PHA or another mitogen, IL-2 and a medium that maintains the viability of said cells, and, optionally, K562 cells or other non-autologous cells that costimulate T cells, wherein, optionally, said cells have been treated to prevent outgrowth.

A forty ninth embodiment is directed to a composition comprising:
(i) T cells and T cell precursor cells (e.g., nonadherent cells, $CD3^+$ cells) that have been separated from dendritic cells and dendritic precursor cells (e.g., adherent cells, $CD11C^+$ or $CD14^+$ cells),
(ii) IL-7 and IL-15, and
(iii) a medium that maintains the viability of said T cells and T cell precursor cells.

A fiftieth embodiment is directed to a composition of any one of embodiments 48-49, wherein the mononuclear cells, T cells or T cell precursor cells have been contacted with dendritic cells that have been contacted or pulsed with at least one peptide antigen, and wherein said composition comprises mononuclear cells, T cells or T cell precursor cells that recognize the at least one peptide antigen.

A fifty first embodiment is directed to a composition comprising dendritic cells and dendritic precursor cells (e.g., adherent cells, $CD11C^+$ or $CD14^+$ cells) that have been separated from T cells and T cell precursor cells (e.g., non-adherent cells, $CD3^+$ cells), at least one agent that generates and matures dendritic cells, and a medium that maintains the viability of said cells; wherein, optionally, said cells have been contacted with one or more peptide antigens and, optionally, treated to prevent outgrowth.

A fifty second embodiment is directed to a bank or cell storage facility which contains one or more samples of the compositions according to any of embodiments 48-51 in combination with a storage or freezing medium; wherein said one or more samples is optionally associated, identified or indexed by information describing its source, including full or partial DNA sequence information, information describing its histocompatibility, such as information describing at least one major and/or minor histocompatibility allele, antigen, or marker, and/or information about the peptide antigens it contains or recognizes.

Figure 5:
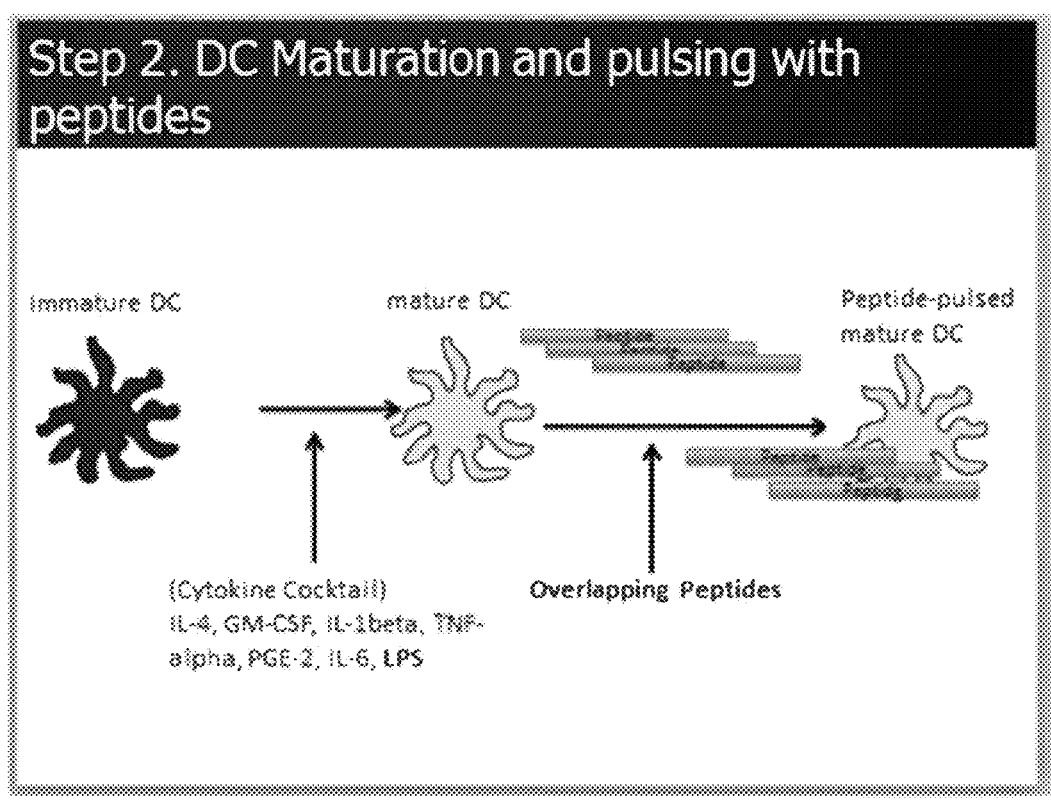
FIG. 5. Dendritic cell maturation and pulsing with peptide antigens.

In another embodiment, which is illustrated by FIGS. 4-8, cord blood is used to produce antigen-specific T cells. A cord blood unit is processed to isolate the mononuclear cells (MNC) into plastic adherent and plastic non-adherent cells. Immature dendritic cells (DCs) adhere to plastic, while the non-adherent portion of MNCs contains naïve T cells. Adherent cells are used to initiate dendritic cells. Non-adherent cells are cryopreserved until needed later in the procedure for priming and expansion of antigen-specific T cells; and a portion of non-adherent cells are non-specifically activated with a mitogen (PHA) to produce activated T cells (ATCs) or PHA blasts; see FIG. 4. In distinction to other conventional methods, the ATCs/PHA blasts are produced from the starting product which is typically cryopreserved. The adherent immature dendritic cells are fed with IL-4 and GM-CSF and five days after initiation were matured by addition of a cytokine cocktail containing IL-4, GM-CSF, IL-1beta, TNF-alpha, PGE-2 (or PGE-1), IL-6, and LPS as shown by FIG. 5. This maturation cocktail contains LPS in distinction to mixes used in other procedures.

Figure 6:
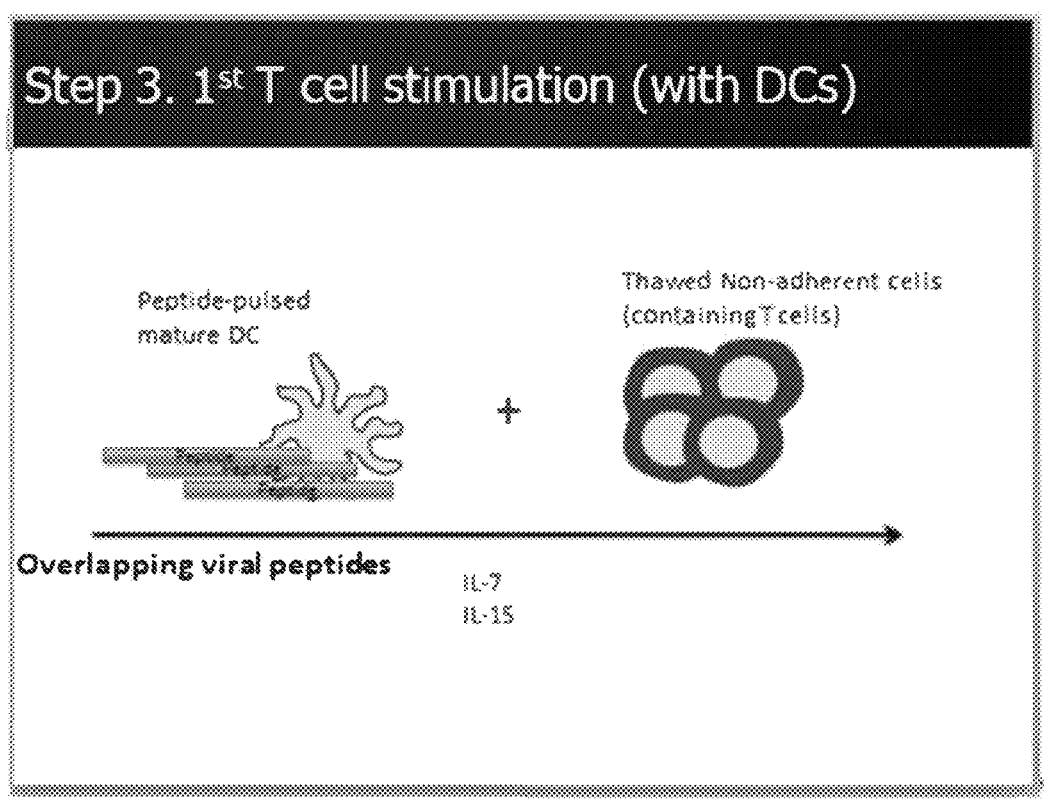
FIG. 6. $1^{st}$ T cell stimulation with dendritic cells.
Figure 7:
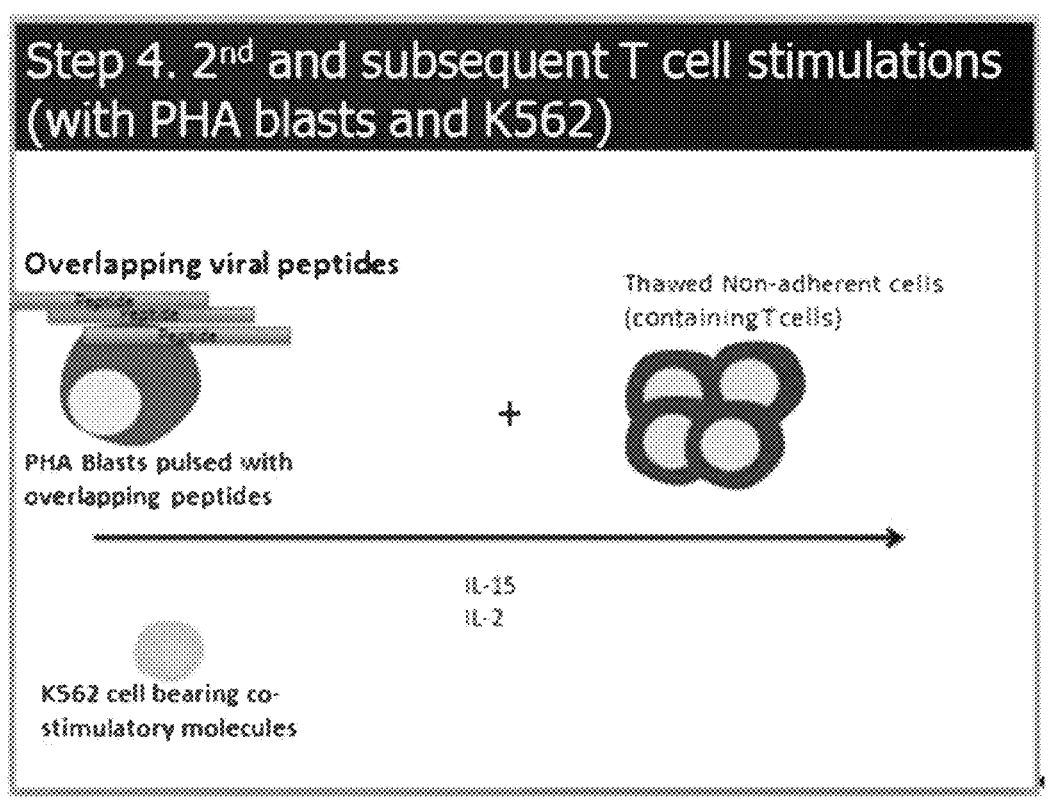
FIG. 7. $2^{nd}$ and subsequent T cell stimulations.
Figure 8:
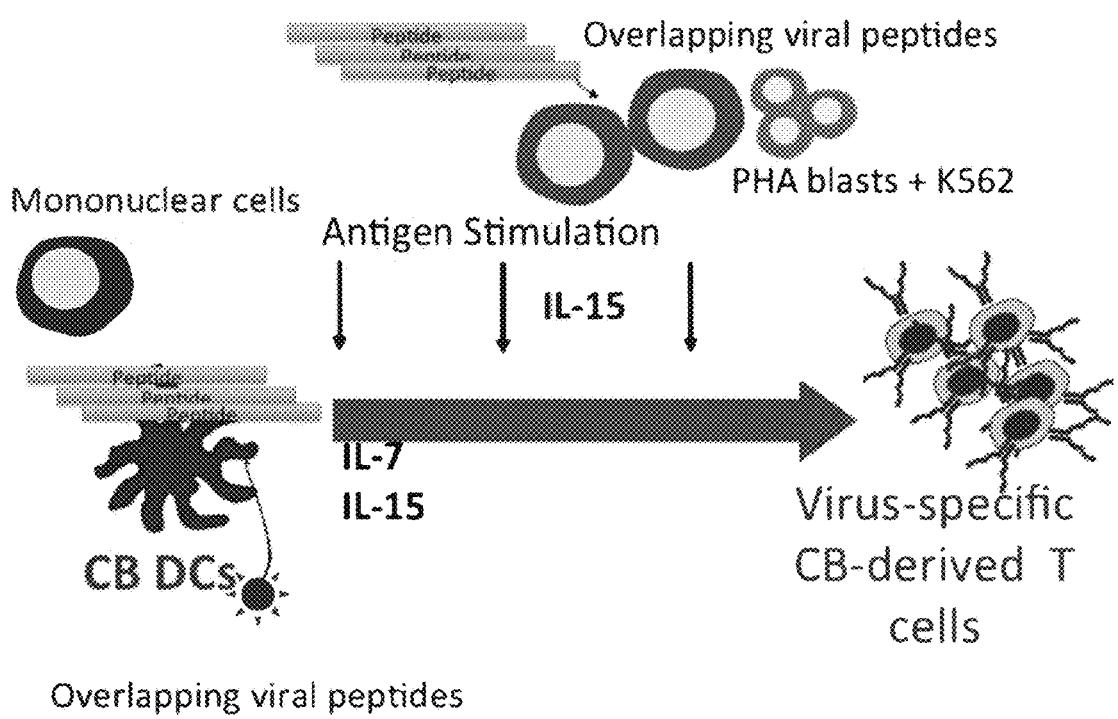
FIG. 8. A general description of one embodiment of the invention.

At initiation, the matured dendritic cells are pulsed with a mixture of overlapping peptides covering one or more antigens of interest. Then, the pulsed, matured dendritic cells are irradiated to prevent their expansion, and combined with the thawed cryopreserved non-adherent cells in the presence of IL-7 and IL-15, as shown in FIG. 6. It is not necessary to use IL-12 in this step. About 14-16 days from initiation of the culture (7-9 days from the first T cell stimulation), PHA blasts (derived from the same cord blood) are pulsed with the same overlapping peptides, irradiated, and then combined with K562 cells; the combination of these two act as the antigen-presenting cells for the previously-expanded T cells; see FIG. 6. Unlike prior methods, this method uses peptide-pulsed PHA-blasts and K562 cells to generate antigen-specific T cells from cord blood and advantageously the T cells do not need to be frozen after one expansion. Furthermore, prior methods required one to wait for the lymphoblastoid cell line (LCL) to be ready before continuing. Since no waiting for the LCL is required, the antigen-specific T cells can be manufactured in about 30 days instead of 60. Another difference between the embodiment above and prior methods is that PHA blasts are used instead of CD3/CD28 blasts. This is because the T cells responding to the PHA are naïve T cells, unlike those in prior protocols which use peripheral blood, where the majority of T cells were memory cells.

Additional embodiments of the disclosed methods and composition include the following.

Suitable concentrations of the cytokines, other biological molecules like LPS or prostaglandin E1 or E2, and peptides, may be selected by one skilled in the medical or immunological arts. In some embodiments, the cytokine concentration may range between 0.1, 0.2, 0.5, 1, 2, 5, 10, 20 or 50 ng/ml or any intermediate subrange or value. In other embodiments, the concentrations of the cytokines and biological molecules may range from 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 3, 4, 5 or 10 times the amounts disclosed in the Examples herein.

The methods for producing antigen-specific T cells disclosed above, wherein isolated or separated CD14+ cells are treated with granulocyte/macrophage-colony stimulating factor (GM-CSF) and IL-, and further comprising treating the CD14+ cells with LPS and/or IFN-gamma for a time and under conditions to facilitate dendritic cell maturation.

The methods for producing antigen-specific T cells disclosed above may further comprising contacting a population of T cells or CD14− cells with IL-21 during their exposure to peptide-loaded CD14+ dendritic cells to facilitate T cell priming.

In some embodiments, the methods disclosed herein use PBMCs, stem cells, pre-T cells, or cord blood, from a partially histocompatible sibling, parent, son or daughter, grandparent, grandson or grand daughter, first or second cousin, or other blood relative. In other embodiments, T cells may be obtained from autologous cells. Those skilled in the art may select an appropriate match by minimizing mismatches of HLA type-I genes (e.g. HLA-A, HLA-B, or HLA-C) which increase the risk of graft rejection, and/or by minimizing the mismatches of an HLA type II gene (e.g. HLA-DR or HLA-DQB1) which increase the risk of graft-versus-host disease. Typically, antigen-specific T cells are produced from naïve cells that share at least 1, 2, 3, 4, 5, 6, 7, 8, 9, 10, 11 or 12 HLA alleles (e.g., HLA-A, HLA-B, HLA-C, HLA-DPA1, HLA-DPB1, HLA-DQA1, HLA-DQB1, HLA-DRA, and HLA-DRB1) with a prospective donor.

In some embodiments, the disclosed methods may further comprise removing memory T cells from donor cells. Methods for memory cell depletion are known in the art and include physical separation using counterflow centrifugal elutriation, fractionation on density gradients, or the differential agglutination with lectins followed by rosetting with sheep red blood cells. Immunological methods utilize antibodies, either alone, in conjunction with homologous, heterologous, or rabbit complement factors which are directed against the T cells. Antibodies to memory T cell markers are commercially available and are also incorporated by reference to hypertext transfer protocol secure://www.rndsystems.com/product-highlights/antibodies-memory-t-cell-sub set-identification# (last accessed Jan. 12, 2021). In other embodiments, T cells expressing particular markers such as for cytoxic T cells, helper T cells or memory T cells may be isolated or recovered for adoptive transfer to a recipient.

In another embodiment, T cells produced by the methods disclosed herein may be adoptively transferred to a patient having a relapse of an HPV infection or HPV-associated malignancy, having minimal residual disease associated with such a malignancy, or otherwise at high risk of a recurrence or relapse of HPV infection or HPV-associated malignancy. Similarly, T cells produced by the methods disclosed herein may be adoptively transferred to a patient having a relapse of a non-HPV viral infection, such as those disclosed herein, or a malignancy associated with such a viral infection or with a cancer, having minimal residual disease associated with such a malignancy or cancer, or otherwise at high risk of a recurrence or relapse such a malignancy or cancer.

A T cell population produced by the methods disclosed above usually or typically recognizes multiple different epitopes of an antigen when a set of peptides overlapping the antigen or antigens of interest is used. In some embodiments, a more limited set of peptides comprising T cell epitopes, or even a single type of peptide comprising a T cell epitope may be used to produce antigen-specific T cells. In some embodiments, CD45RO+ cells may be depleted prior to either priming or expansion of T cells.

Such T cells supplement exisiting immunity by providing a broader spectrum of cellular immunity against pathogens bearing the antigens or epitopes recognized by the T cells. For example, to produce a broad cellular immune response, naïve cell populations are exposed to antigen-presenting cells pulsed with, and presenting, peptides overlapping an antigen of interest, such as a particular HPV antigen. In some embodiments, CD45RO$^+$ cells may be depleted prior to either priming or expansion of T cells The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

Terminology

An "accessory cell" is an artificial or natural cell, such as a K562 cell, that provides costimulation for recognition of peptide antigens by T cells or that otherwise assists a T cell recognize, become primed, or expand in the presence of a peptide antigen.

An "activated T cell" or "ATC" is obtained by exposing a mononuclear cell in cord blood or another sample containing naïve immune cells to a mitogen, such as phytohemagglutinin (PHA) and/or Interleukin (IL)-2.

An "allogeneic" donor is one whose genetic background, such as HLA alleles, differs from those of a recipient. Some allogeneic donors will not have any HLA alleles in common with a recipient, while others will share at least one HLA allele with a recipient and thus be partially histocompatible with the recipient.

An "antigen" includes molecules, such as polypeptides, peptides, or glyco- or lipo-peptides that are recognized by the immune system, such as by the cellular or humoral arms of the immune system. The term "antigen" includes antigenic determinants, such as peptides with lengths of 6, 7, 8, 9, 10, 11, 12, 13, 14, 15, 16, 17, 18, 19, 20, 21, 22 or more amino acid residues that bind to MHC molecules, form parts of MHC Class I or II complexes. T cell antigens are usually proteins or peptides. This term includes peptide antigens recognized by alpha-beta T cells or gamma-delta T cells, as well as lipid or heat-shock protein epitopes, or epitopes of stress-induced antigens recognized by gamma-delta T cells. A MHC restricted peptide antigen or epitope that is recognized by a T cell can trigger a cellular immune response by the T cell. Thus, a T cell antigen may stimulate a CD8+ T cell response, a CD4+ T cell response, a gamma delta T cell response, or stimulate a combination of these.

"Antigen presenting cells (APCs)" refers to a class of cells capable of presenting one or more antigens in the form of a MHC-peptide complex recognizable by specific effector cells of the immune system, and thereby inducing an effective cellular immune response against the antigen or antigens being presented. Examples of professional APCs are dendritic cells and macrophages, though any cell expressing MHC Class I or II molecules can potentially present a peptide antigen to a T cell.

An "autologous" donation is typically derived from the cells of the same individual, for example, from a recipient's own cord blood or expanded PBMCs. In some instances an autologous donation may be obtained from an identical twin. Typically, an autologous transplant will match all of the HLA alleles of the recipient.

"BK virus" is a member of the polyomavirus family. Past infection with the BK virus is widespread, but significant consequences of infection are uncommon, with the exception of the immunocompromised and the immunosuppressed. The methods disclosed herein may be used to produce antigen-specific T cells to antigens or epitopes of BK virus.

A "control" is a reference sample or subject used for purposes of comparison with a test sample or test subject. Positive controls measure an expected response and negative controls provide reference points for samples where no or a background response is expected.

"Cord blood" has its normal meaning in the art and refers to blood that remains in the placenta and umbilical cord after birth and contains hematopoietic stem cells. Cord blood may be fresh, cryopreserved or obtained from a cord blood bank.

The term "coronavirus" includes viruses within the coronavirus family including SARS-COV and MERS-COV. It includes SARS-COV-2 which is the etiological agent of Coronavirus disease 2019 (COVID-19). Coronavirus antigens which may be used in the methods disclosed herein include the spike (S), envelope (E), membrane (M) and nucleocapsid (N) proteins.

The term "cytokine" has its normal meaning in the art. Examples of cytokines used in the invention include IL-2, IL-7, IL-12, IL-15, and IL-21.

"Cytomegalovirus (CMV)" is a genus of viruses in the order Herpesvirales. The eight species in this genus include the type species, Human betaherpesvirus 5 (HCMV, human cytomegalovirus, HHV-5), which is the species that infects humans. Diseases associated with HHV-5 include mononucleosis, and pneumonia. Cytomegalovirus is a common virus. Once infected, a subject retains the virus for life. Most people don't know they have CMV because it rarely causes problems in healthy people. However, subjects with weakened or suppressed immune systems or pregnant women are at increased risk for infection. The methods disclosed herein may be used to produce antigen-specific T cells to antigens or epitopes of CMV.

The term "dendritic cell (DC)" or describes a diverse population of morphologically similar cell types found in a variety of lymphoid and non-lymphoid tissues, see Steinman, Ann. Rev. Immunol. 9:271-296 (1991). Some embodiments of the invention involve dendritic cells and dendritic cell precursors derived from cord blood.

A "donor" is a person from whom PBMCs, stem cells or cord blood cells, are obtained, for example, for ex vivo priming and/or expansion as disclosed herein. When a donor is selected for production of antigen-specific T cells for adoptive transfer to a particular subject, the donor typically will share 1 or more major histocompatibility antigens with the recipient.

The term "effector cell" describes a cell that can bind to or otherwise recognize an antigen and mediate an immune response. Antigen-specific T cells are effector cells.

"Epstein Barr Virus (EBV)" is herpesvirus causing infectious mononucleosis and is associated with several malignancies, including nasopharyngeal carcinoma, gastric carcinoma, Hodgkin lymphoma, Burkitt lymphoma, and lymphomas in immunocompromised persons, as well as multiple sclerosis. The methods disclosed herein may be used to produce antigen-specific T cells to antigens or epitopes of EBV.

"Human immunodeficiency virus (HIV)" is a Lentivirus (a subgroup of retrovirus) that infects humans. Two types of HIV, HIV1 and HIV2, have been characterized. Over time, it causes acquired immunodeficiency syndrome (AIDS), a condition in which progressive failure of the immune system allows life-threatening opportunistic infections and cancers to thrive. The methods disclosed herein may be used to produce antigen-specific T cells to antigens or epitopes of HIV.

"Human papilloma virus" is a DNA virus in the papilloma virus family that infects humans. At least 170 subtypes are known, many of which are transmitted by sexual contact. High risk HPV types are associated with cancers and genital dysplasia, notably cervical cancer, and vulvar, vaginal, penile, anal and oropharyngeal cancers. Types 16, 18, 31, 33, 35, 39, 45, 51, 52, 56, 58, 59, 68, 73, and 82 are carcinogenic high-risk sexually transmitted HPVs and may lead to the development of cervical intraepithelial neoplasia (CIN), vulvar intraepithelial neoplasia (VIN), penile intraepithelial neoplasia (PIN), and/or anal intraepithelial neoplasia (AIN). High-risk types 16, 18 cause the most cervical cancer, but high risk types 31, 33, 35, 39, 45, 52, 58, 59, and others are considered carcinogenic. Stanley M. Immunobiology of HPV and HPV vaccines. *Gynecologic oncology.* 2008; 109: S15-21; Moodley M. Update on pathophysiologic mechanisms of human papillomavirus. *Current opinion in obstetrics & gynecology.* 2005; 17:61-64; Cooper K, McGee J O. Human papillomavirus, integration and cervical carcinogenesis: a clinicopathological perspective. *Molecular pathology: MP.* 1997; 50:1-3; Lowy D R, Schiller J T. Human papillomavirus biology. *Journal of the National Cancer Institute. Monographs.* 1996:141-143. Stanley M A, Pett M R, Coleman N. HPV: from infection to cancer. *Biochemical Society Transactions.* 2007; 35:1456-1460.

Low-risk HPV types are associated with warts or other conditions. HPV types 2 and 4 are most commonly associated with warts by also types 1, 3, 26, 29, and 57, and others. Plantar warts (myrmecia)—HPV type 1 (most common); also types 2, 3, 4, 27, 28, and 58 and others. Anogenital warts (condylomata acuminata or venereal warts)—HPV types 6 and 11 (most common); also types 42, 44 and others. Low-risk: 6, 11 (most common); also 13, 44, 40, 43, 42, 54, 61, 72, 81, 89, and others. Flat warts—HPV types 3, 10, and 28. Butcher's warts—HPV type 7. Heck's disease (Focal epithelial hyperplasia)—HPV types 13 and 32.

An "infiltrating lymphocyte" is one that has entered a particular biological compartment or tissue, mucosal layer (e.g., epithelium, lamina propia) or skin layer (e.g., stratum corneum, stratum lucidum, stratum granulosum, stratum spinosum, stratum basate and dermis). These include those infiltrating a neoplasm, tumor or cancer including cervical cancer, anal, penile, oropharyngeal, vulvar, or vaginal cancers. It includes lymphocytes that have infiltrated a papilloma, including squamous cell papilloma, inverted papilloma, urothelial papilloma, intraductal papilloma or the breast, or wart, such as a plantar or genital wart. Antigens recognized by infiltrating lymphocytes may be selected to prime and expand T cells as disclosed herein, which have specificity for HPV-related conditions in particular tissues.

The term "isolated" means separated from components in which a material is ordinarily associated with, for example, an isolated cord blood mononuclear cell can be separated from red blood cells, plasma, and/or other components of cord blood.

"Mucosa" or mucous membranes have their conventional anatomical and physiological meanings. These include ocular mucosal, nasal mucosa, olfactory mucosa, oral mucosa, bronchial mucosa and the lining of vocal folds, esophageal mucosa, gastric mucosa, intestinal mucosa, anal mucosa, penile mucosa, and vaginal mucosa, and endometrium which is the mucosa of the uterus. Mucosa are susceptible to infection by HPV and other pathogens.

A "naïve" T cell or other immune effector cell is one that has not been exposed to an antigen or to an antigen-presenting cell presenting a peptide antigen capable of activating that cell. Naïve T cells include T cells that have differentiated in the thymus, and successfully undergone the positive and negative processes of central selection in the thymus including naïve forms of helper T cells and cytotoxic T cells. Most naïve T cell s are considered immature and, unlike activated or memory T cells, have not encountered cognate antigens within the periphery. The methods disclosed herein may be performed using naïve or non-naïve T cells or other immune effector cells.

A "naïve subject" includes those who have never been infected by, or never induced a significant cellular immune response against HPV or one or more of its T cell epitopes or against those of another pathogen or cancer. A subject may also be naïve to a particular antigen or epitope of a pathogen or cancer. The methods disclosed herein may be performed on naïve or non-naïve subjects or with T cells or other immune effector cells from naïve or non-naïve subjects.

A "pathological condition" includes diseases or disorders caused by infectious microbes including viruses, bacteria, fungi, yeasts, parasites, prions or cancers. It may also refer to an autoimmune disease mediated by T cells or characterized by expression of disease-associated antigens or epitopes such as neoepitopes not expressed by normal cells.

A "peptide library" or "overlapping peptide library" within the meaning of the application is a complex mixture of peptides which in the aggregate covers the partial or complete sequence of a protein antigen, especially those of opportunistic viruses. Successive peptides within the mixture overlap each other, for example, a peptide library may be constituted of peptides 15 amino acids in length which overlap adjacent peptides in the library by 11 amino acid residues and which can span the entire length of a protein antigen or select portions of an antigen. However, other kinds of overlapping peptide libraries comprising peptides containing T cell epitopes may be used which have different lengths (e.g., 8, 9, 10, 11, 12, 13, 14, 15, 16, 17, 18, 19, 20, 21, 22, 23, 24, or 25 or more residues) and different amounts of overlapping peptides (e.g., 6, 7, 8, 9, 10, 11, 12, 13, 14, 15, 16 or more overlapping residues). Peptide libraries are commercially available and may be custom-made for particular antigens. Methods for contacting, pulsing or loading antigen-presenting cells are well known and incorporated by reference to Ngo, et al. (2014).[23]

A "precursor cell" describes a cell which can differentiate, mature, or otherwise be transformed into another kind of cell. For example, a "T cell precursor cell" can differentiate into a T cell and a "dendritic precursor cell" can differentiate into a dendritic cell.

A "subject" is a vertebrate, preferably a mammal, more preferably a human. Mammals include, but are not limited to humans, simians, equines, bovines, porcines, canines, felines, murines, other farm animals, sport animals, or pets. Subjects include those in need of antigen-specific T cells, such as those with lymphocytopenia, those who have undergone immune system ablation, those undergoing transplantation and/or immunosuppressive regiments, those having naïve or developing immune systems, such as neonates, or those undergoing cord blood or stem cell transplantation.

A "recipient" is a subject who receives a transfer of antigen-specific T cells, typically, a person who has at least one major histocompatibility antigen in common with the donor who can be designated as being at least partially histocompatible with the antigen-specific T cells. In some embodiments, the donor and recipient will be the same and thus involve the transfer or autologous antigen-specific T cells. For example, the recipient may receive antigen specific T cells produced from autologous PMBCs, stem cells including embryonic stem cells or peripheral blood stem cells, or cord blood (or from those of a genetically identical twin). In most embodiments a recipient will share at least 1, 2, 3, 4, 5, 6, 7 or 8, preferably at least 6 of 8, major histocompatibility antigens with the antigen specific T cells of an allogenic donor. For example, the recipient may receive antigen-specific T cells produced from PBMCs of a parent, child, sibling, cousin, or other close relative.

A "T cell" includes cytotoxic T cells (CTLs, $CD8^+$), helper T cells ($CD4^+$), regulatory T cells ($CD4^+$), memory T cells, and innate-like T cells such as natural killer cells, muscosal associated invariant T cells, and gamma-delta T cells. CTLs recognize antigen in the context of MHC class I and, like T$_H$ cells, are fully activated by accessory costimulatory molecules. CTLs kill target cells, such as virus-infected host cells, directly by inducing apoptosis. They release preformed perforins at the target cell surface to generate transmembrane pores in the target cell, through which a second set of proteins and granzymes gain entry into the cytosol to initiate an apoptotic series of events. CTLs can also deliver apoptotic signals via surface-bound molecules.

A "tumor antigen" or "cancer antigen" includes tumor-specific antigens and tumor-associated antigens and so-called public antigens. It may also include neoantigens or private antigens specific to a single patient. Examples of such antigens include PRAME, NYESO, MAGE A4, MAGE A3, MAGE A1, Survivin, WT1, neuroelastase, proteinase 3, p53, CEA, claudin6, Histone H1, Histone H2, Histone H3, Histone H4, MART1, gp100, PSA, SOX2, SSX2, Nanog, Oct4, Myc, and Ras.

"Varicella Zoster Virus (VSV)" also known as Human alphaherpesvirus 3 (HHV-3), is one of nine herpesviruses known to infect humans. It causes chickenpox (varicella), a disease most commonly affecting children, teens, and young adults, and shingles (herpes zoster) in adults. In an immunocompromised patient it may cause disseminated primary varicella infection which carries high morbidity, central nervous system complications such as Reye syndrome, Guillain-Barŕ syndrome and encephalitis, or thrombocytopenia and purpura. The methods disclosed herein may be used to produce antigen-specific T cells to antigens or epitopes of VSV.

Example 1

Generation of HPV16 E6/E7 Specific T Cells

Overlapping peptide libraries (15-mers overlapping by 11 amino acids) of HPV16-E6 (Protein ID P03126) and HPV16-E7 (P03129) were purchased from JPT Peptide Technologies (Berlin, Germany). Peptides were reconstituted in dimethyl sulfoxide (DMSO) (Sigma-Aldrich, St. Louis, MO).

Monocytes (CD14$^+$) were isolated from PBMCs by CD14 selection using MACS Beads (Miltenyi Biotec, San Diego, CA) and cultured in 24-well plates (1×10$^6$ cells/well) in DC medium [CellGenix medium (CellGenix GmbH, Freiburg, Germany) and 1% alanyl-glutamine (GlutaMAX; Gibco Life Technologies, Grand Island, NY)], with 800 U/mL granulocyte/macrophage-colony stimulating factor (GM-CSF) (R&D Systems, Minneapolis, MN) and 1000 U/mL IL-4 (R&D Systems).

Dendritic cells (DCs) were fed with GM-CSF and IL-4 on day 3.

On the morning of day 5, 1 ml of media was removed from the wells and 1 μL peptide mixture (E6 and E7) was added to each of the wells.

At least one hour later in the afternoon of day 5, DCs were matured by adding 1 mL of DC media per well with the following cytokines at these final concentrations: 100 ng/mL IL-6 (R&D Systems), 10 ng/mL IL-1β (R&D Systems), 10 ng/mL TNFα (R&D Systems), 1 μg/mL prostaglandin E2 (R&D Systems), 800 U/mL GM-CSF, 1000 U/mL IL-4, and 30 ng/mL LPS.

On day 7, DCs were harvested and re-suspended at 1×10$^5$ cells/mL in CTL medium [45% Click's medium (Irvine Scientific, Santa Ana, CA), 45% RPMI-1640 (HyClone, Logan, UT), 10% human AB serum (Gemini BioProducts, West Sacramento, CA) and 1% GlutaMAX].

CD14-negative PBMCs were thawed and re-suspended at 1×10$^6$ cells/mL in CTL medium. Cells were stimulated with peptide-loaded DCs at a 1:10 ratio (DCs: CD14−) in CTL medium with 10 ng/mL IL-6, 10 ng/mL IL-7 (R&D Systems), 10 ng/mL IL-12 (R&D Systems) and 10 ng/mL IL-15 (R&D Systems).

Nine to twelve days after the first stimulation, T cells were harvested, counted and stimulated again at a concentration of 1×10$^6$ cells/mL in CTL medium (1×10$^6$ cells/mL per well of 24-well plates) with a second population of newly prepared peptide-loaded DCs and IL-7 and IL-15 (or alternatively with IL-7, IL-12, and IL-15, or IL-6, IL-7, IL-12, and IL-15).

Cell cultures were supplemented with IL-2 (R&D Systems) if necessary.

Seven days after the second stimulation, T cells were harvested, counted, re-suspended at 2.5×10$^5$/mL and stimulated for a third time with a third population of newly prepared peptide-loaded DCs and IL-2 and IL-15. Cell cultures were alternately supplemented with IL-2 or IL15 (R&D Systems) as necessary.

Figure 2:
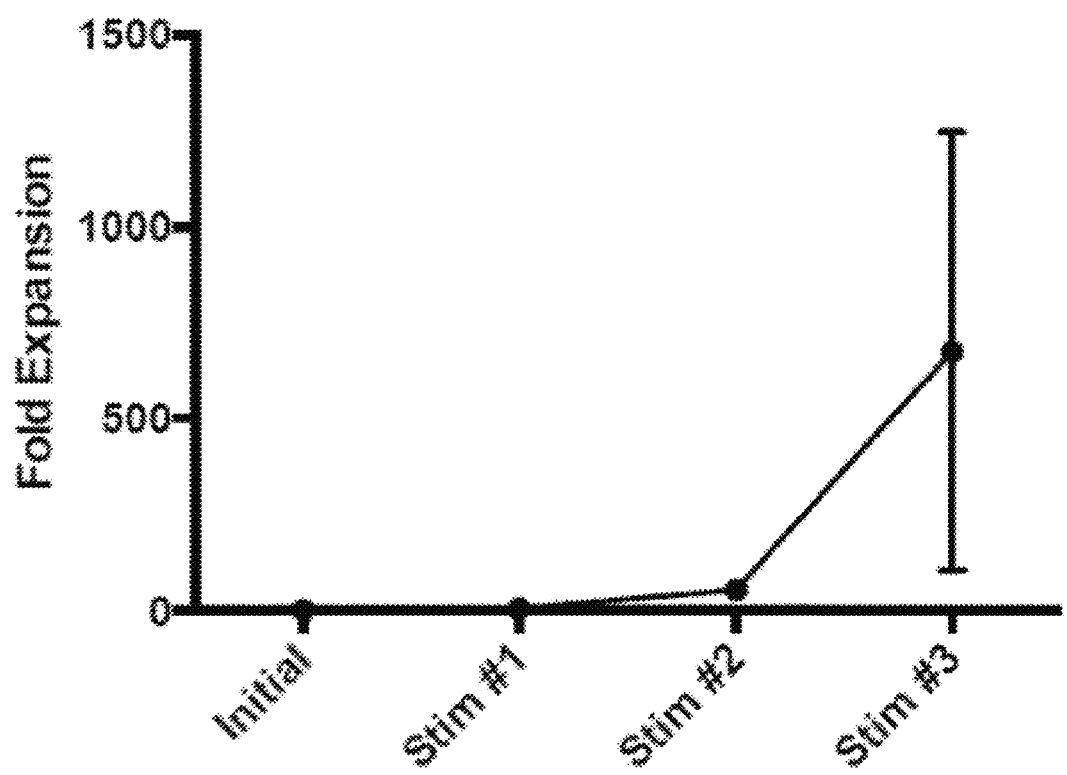
FIG. 2. T cells that recognize HPV (n=5) can be expanded to clinically relevant numbers following three stimulations showing that the invention robustly manufactures HPV-recognizing or HPV-specific T cells for clinical or other uses.
Figure 3:
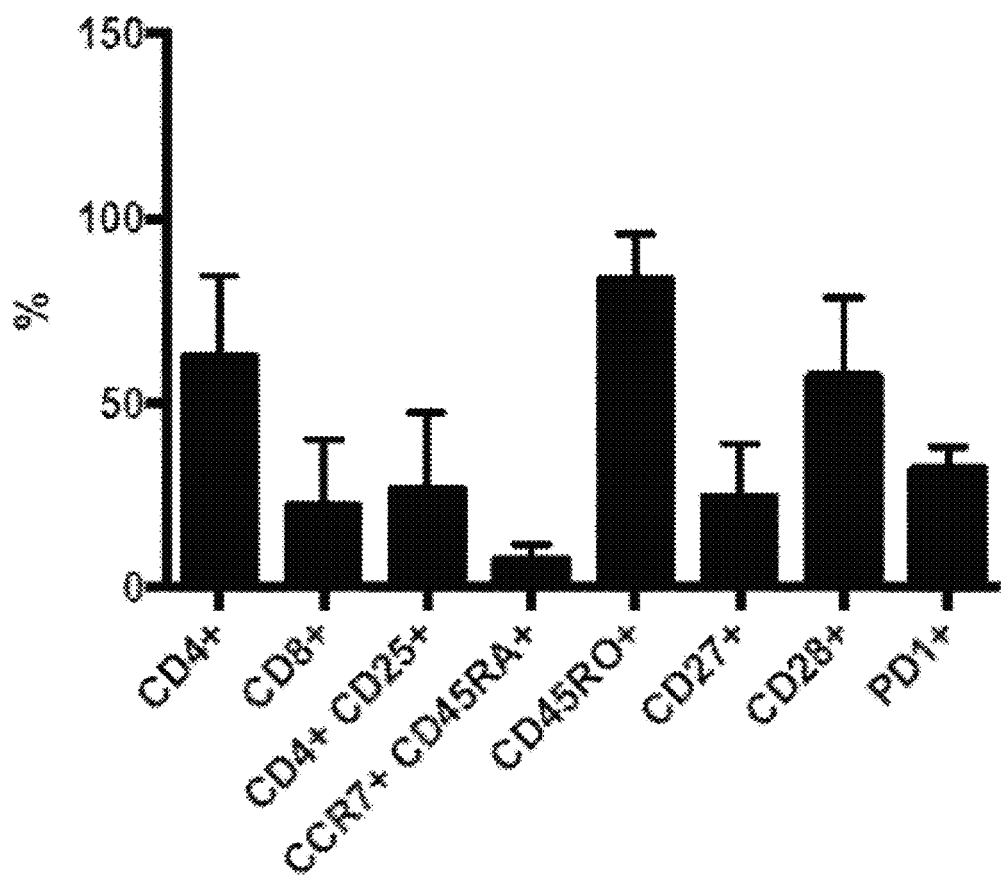
FIG. 3. T cells that recognize HPV (n=5) have a mixed phenotype (CD4+ and CD8+) which has been shown to promote better responses from T cell infusions. CD4+ CD25+ cells are regulatory T cells that can suppress the activation of self-reactive T cells and prevent autoimmunity. Naïve T cells can express CCR7 and CD45RA. The CD45RO isoform is expressed on activated and memory T cells. CD28 and CD27 are costimulatory molecules, which provide the signals needed for specific T cell activation. The PD-1 (programmed cell death-1) receptor is expressed on the surface of activated T cells.
Figure 4:
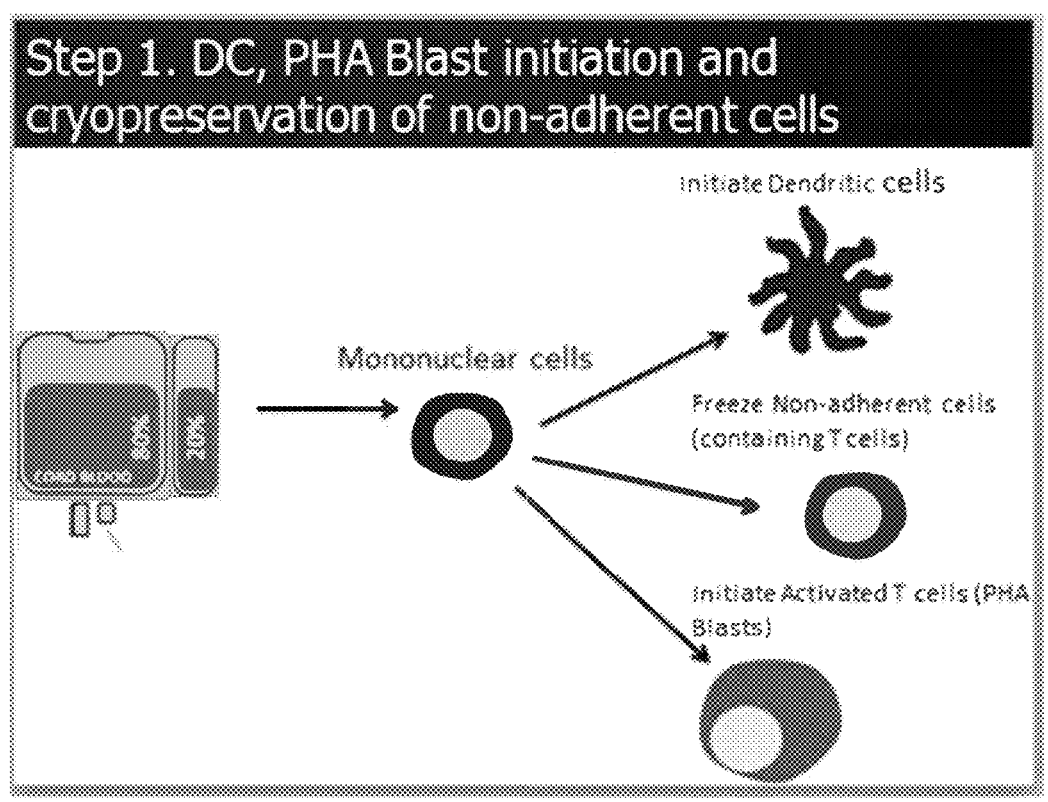
FIG. 4. Dendritic cell, PHA blast initiation, and cryopreservation of non-adherent cells.

The HPV-specific T cells produced by this method were evaluated as shown by FIGS. 1-3. These figures show that the method disclosed herein generates T cells from cells obtained from healthy donors not infected by HPV that recognize HPV E6 and E7 antigens.

These cells can be expanded as described herein and exhibit cell surface markers that have a mixed phenotype (CD4 and CD8). A mixed phenotype has been shown to promote better responses from T cell infusions. Cells also express the costimulatory receptors CD27 and CD28.

Expression of mixed CD4$^+$CD8$^+$ cell surface markers has been associated with induction of an adaptive immune response against infectious pathogens such as those of multiple past, latent and high-level persistent viral infections. CD4$^+$CD8$^+$ T cells broaden the perception of T cell population involved in antiviral immune responses; Nacimbene, et al., Blood 2004 104:478-486. The methods described herein generate a large numbers of mixed CD4$^+$CD8$^+$ T cells that recognize HPV and may potentially serve as superior effectors of anti-HPV immunity than T cells having other cell surface phenotypes.

Expression of CD4$^+$, CD45RO$^+$ and CD27$^+$ T cell markers is associated with decreased persistence of HPV and with resistance to HPV infection; Rodriguez, et al., Int J Cancer. 2011 Feb. 1; 128(3): 597-607. HPV-specific T cells produced by the methods disclosed herein may be used to protect subjects having or at risk of acquiring persistent HPV infections. These at risk subjects include smokers, tobacco smokers or users of chewing tobacco, those with poor oral hygiene who are at increased risk of oropharyngeal cancer, those having weakened immune systems, including diseases like HIV, those on immunosuppressive drugs or regimens, such as cancer patients or subjects receiving blood transfusions or tissue transplants, and those at higher risk of cervical cancer including women having multiple children, women using oral contraceptives, especially for a long term. Subjects with diseases, disorders or conditions characterized by chronic inflammation or aged individuals (e.g., at or above 50, 60, 70, or 80 years of age) are also at higher risk of persistent HPV infection than normal subjects.

T cells generated by the methods disclosed herein also contained a high frequency of, or level of, costimulatory receptors CD27 and CD28 as shown in FIG. 3.

T cells expressing CD27 can be costimulated via CD27. Viruses are known to modulate expression of CD27 as a means to evade the host immune system. So generation of T cells expressing CD27 provides a means for these cells to induce virus-specific immunity during acute or persistent viral infection; see Welten, et al., J Virol. 2013 June; 87(12):6851-65.

The methods disclosed herein produce large numbers of T cells that recognize HPV antigens that are CD27+ and that would be capable of costimulation via CD27. T cell persistence is promoted by CD27 costimulation and may improve clinical efficacy of adoptive immunotherapy of subjects such as those infected with HPV or having persistent HPV infections. Mechanisms accounting for CD27-mediated human T cell survival in vivo may include upregulation of anti-apoptotic molecules, instructed CD4 help and autocrine IL-2 production by CD8+ T cells in vivo; see Song, et al., Oncoimmunology, 2012 Jul. 1; 1(4): 547-549.

T cells expressing CD28 can be costimulated via CD28 during the effector phase of an anti-viral T cell response. T cells that do not express CD28 or in which the CD28 receptor is blocked exhibit decreased responses to virus and result in increased apoptosis and decreased viral clearance; see Dolfi, et al., J Immunol. 2011 Apr. 15; 186(8):4599-608. The methods disclosed herein produced large numbers of CD28+ T cells that recognized HPV antigens and that are capable of costimulation via CD28.

Example 2

Production Antigen-Specific T Cells from Cord Blood

Non-adherent mononuclear cells isolated from cord blood (e.g., naïve T cells) were stimulated by contact with irradiated peptide-pulsed antigen presenting cells prepared from adherent cells in cord blood (e.g., monocytes, dentritic cells, etc.) and then by irradiated peptide-pulsed antigen presenting cells non-specifically from cord blood. This method was used to produce from cord blood populations, antigen-specific T cells recognized viral antigens.

Specifically, mononuclear cells were isolated from cord blood by centrifugation at 800×g for 20 minutes with little acceleration and brake and at room temperature on a Ficoll gradient. Approximately 10 million of the isolated mononuclear cells were reserved to produce non-specifically expanded T cells (antigen-presenting cells) also known as "Activated T Cells" or "ATCs". In this case, Phytohemagglutinin (PHA) was used to stimulate the ATCs.

The remaining isolated mononuclear cells were plated onto tissue culture plates containing CELLGENIX CELL-GRO® serum-free medium. After 1-2 hours, the tissue culture plates were washed with PBS to remove non-adherent cells which were then cryopreserved and saved for later use.

The cells that adhered to the cell culture plates after washing were mixed with cytokines to generate dendritic cells (DC). This was done by contacting the cells with 1000 U/mL Interleukin (IL)-4, and 800 U/mL Granulocyte-Macrophage/Colony Stimulating Factor (GM-CSF) and then with 30 ng/mL Lipopolysaccharide (LPS), 10 ng/mL Tumor Necrosis Factor Alpha (TNF-α), 10 ng/mL IL-10, 100 ng/mL IL-6, and 1 ug/mL Prostaglandin (PGE)-2 or PGE-1, along with 1000 U/mL IL-4 and 800 U/mL GM-CSF.

Once the dendritic cells matured for 7 days from initiation and they were pulsed with a pool of overlapping peptides containing about 200 ng of each peptide per million cells obtained from an overlapping peptide library.

In this case the overlapping peptides were obtained from JPT and included IE-1 and pp65 from CMV, Hexon and Penton from Adenovirus, and LMP1, LMP2 and BZLF-1 from EBV. These overlapping peptide mixtures, or "Pepmixes" (PEPMIX™), consisted of 15 amino acid peptides that spanned the entire protein (antigen) and overlapped neighboring peptides by 11 amino acids. This allowed for the expansion of both CD4+ and CD8+ T cells, regardless of the MHC class-restriction. Following the pulsing of the mature dendritic cells with the pool of overlapping peptides the cells were irradiated at 25 Gy to prevent their outgrowth.

At this time, the cryopreserved non-adherent cells previously washed off the cell culture plates were thawed and plated with the peptide-pulsed dendritic cells at an approximate ratio of 1 DC to 10 non-adherent cells in the presence of the cytokines 10 ng/mL IL-7 and 5 ng/mL IL-15. This represented an initial antigen-stimulation of the cyropreserved non-adherent mononuclear cells (e.g., naïve T cells). Cells were grown in a naïve T cell-specific medium containing 45% Advanced RPMI, 45% Click's (EHAA) medium, 10% human AB serum, and 200 mM GLUTA-MAX®.

The cyropreserved non-adherent cells cells (e.g., naïve T cells) were cultured for 8-10 days in the presence of the irradiated (25 Gy for DC and 75 Gy for ATCs and K562 cells) peptide-pulsed non-adherent cells and then harvested, the number of T cells determined, and resuspended in a T cell medium.

The T cells in the resuspension were contacted with irradiated ATCs, which had been pulsed with the same pool of overlapping peptides that were present on the irradiated mature dendritic cells derived from the adherent mononuclear cells of cord blood, at a ratio of 1 T cell to 1 irradiated ATC to 5 K562 cells in the presence of cytokine IL-15 (5 ng/mL) followed by twice-weekly feeds with the IL-2 cytokine (50-100 U/mL).

After this secondary stimulation, T cells which recognized antigenic determinants in the pool of overlapping peptides were recovered. This was achieved by assessing T cell activation via IFN-gamma ELISPOT assay and assessing the cytolytic ability of the T cells in a chromium release cytotoxicity assay.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references and does not constitute an admission as to the accuracy of the content of such references.

The invention claimed is:

1. A process for producing a human papilloma virus (HPV) antigen-specific T cell comprising:
   (a) dividing mononuclear cells from a sample from any cell source containing naïve immune cells, wherein the cells in the sample are naïve to HPV antigens, into several portions;
   (b) stimulating a first portion of said sample with phytohemagulutinin (PHA) or another mitogen and with interleukin 2 (IL-2) to produce activated T cells ("ATCs") that serve antigen presenting functions during subsequent stimulations and optionally treating the ATCs with radiation or another agent to inhibit their outgrowth;

(c) separating T cells and T-cell precursor cells from dendritic cells and dendritic precursor cells in a second portion of the sample;

(d) cryopreserving or otherwise reserving the T cells and T-cell precursor cells from (c);

(e) differentiating the separated dendritic cells and dendritic precursor cells from (c) with cytokine(s) or other agent(s) that generate and mature dendritic cells and with at least one HPV peptide antigen or HPV antigen mix to produce antigen-presenting dendritic cells that present at least one HPV peptide antigen, and optionally treating said antigen-presenting dendritic cells with radiation or another agent sufficient to inhibit their outgrowth;

(f) stimulating the cryopreserved or otherwise reserved T cells and T-cell precursor cells from (d) with the dendritic antigen-presenting cells produced in (e) in the presence of interleukin 7 (IL-7) and interleukin 15 (IL-15) to produce antigen-specific T cells that recognize the at least one HPV peptide antigen;

(g) stimulating antigen-specific T cells produced by (f) with the ATCs of (b) in the presence of the at least one HPV peptide antigen, optionally, in the presence of K562 cells or other accessory cells in the presence of IL-2 and/or IL-15; optionally, repeating (g) one or more times; and (h) recovering antigen-specific T cells that recognize the at least one HPV peptide antigen.

2. The process of claim 1, further comprising separating mononuclear cells containing naïve T cells prior to (a).

3. The process of claim 1, wherein the mononuclear cells are obtained from cord blood.

4. The process of claim 1, wherein the mononuclear cells are obtained from hematopoietic stem cells naïve to the at least one HPV peptide antigen.

5. The process of claim 1, wherein the mononuclear cells are obtained from a sample containing stem cells, precursor T cells, or T cells from a subject whose immune system is naïve to the at least one HPV peptide antigen.

6. The process of claim 1, wherein (b) comprises stimulating a first portion of said sample with PHA and with IL-2 to produce activated T cells ("ATCs").

7. The process of claim 1 that comprises stimulating about 1 to 20 million mononuclear cord blood cells with PHA and IL-2 in (b).

8. The process of claim 1, wherein (b) comprises producing T-blasts, B-blasts, lymphoblastoid cells, or CD3-CD28 blasts instead of PHA blasts as activated T cells.

9. The process of claim 1, wherein T cells and T cell precursor cells are separated from dendritic cells and dendritic precursor cells by culturing the second portion via plastic adherence under conditions sufficient for cells in the second portion to adhere to the cell culture plate or device and then removing T cells and T cell precursor cells from the cell culture plate or device and recovering the dendritic cells and dendritic precursor cells attached to the solid medium.

10. The process of claim 1, wherein in (e) the dendritic cells and dendritic precursor cells are grown in the presence of cytokines necessary for differentiation and maintenance of dendritic cells, including but not limited to interleukin 4 (IL-4) and granulocyte-macrophage colony-stimulating factor (GM-CSF).

11. The process of claim 1, wherein in (e) the dendritic cells and dendritic precursor cells are allowed to undergo maturation with a dendritic cell-maturing cytokine or agent selected from the group consisting of one or more of lipopolysaccharide (LPS), tumor necrosis factor alpha (TNF-alpha), interleukin 1 beta (IL-1 beta), interleukin 6 (IL-6), prostaglandin E1 (PGE1), prostaglandin E2 (PGE2) and other immune adjuvants, along with IL-4 and GM-CSF.

12. The process of claim 1, wherein in or prior to (f) the T cells or T cell precursor cells are treated to expand CD45RA positive cells.

13. The process of claim 1, wherein, in or prior to, (f) the T cells and T cell precursors are treated to deplete CD45RO positive cells.

14. The process of claim 1, wherein said at least one antigen comprises a series of overlapping peptides spanning an entire HPV protein or antigen.

15. The method of claim 1, wherein the antigen-specific T cells recognize at least one antigen of an opportunistic HPV that is acquired nosocomially or iatrogenically or that is transmitted to a subject in a hospital or a hospital-acquired infection.

16. The process of claim 1, wherein said at least one peptide antigen comprises an HPV antigen or peptide library.

17. The process of claim 1, wherein said at least one peptide antigen comprises an HPV E1-E5 antigen or peptide library.

18. The process of claim 1, wherein said at least one peptide antigen comprises an HPV E6 or E7 antigen or peptide library.

19. The process of claim 1, wherein said at least one peptide antigen comprises an HPV L1 or L2 antigen or peptide library.

20. The process of claim 1, wherein said at least one peptide antigen is one recognized by a T-cell isolated from a site, tissue or cell infected with HPV.

21. A composition comprising antigen-specific T cells produced by the process of claim 1.

22. T cells produced by the process according to claim 1 that recognize at least one HPV epitope and that have cell surface phenotype $CD4^+CD8^+$.

23. T cells produced by the process according to claim 1 that recognize at least one HPV epitope and that have cell surface phenotype $CD4^+$, $CD45RO^+$ and $CD27^+$.

24. T cells produced by the process according to claim 1 that recognize at least one HPV epitope and that have cell surface phenotype $CD27^+$ and $CD28^+$.

25. A method for preventing or treating an HPV infection comprising administering a T cell produced by the process according to claim 1.

26. A bank or cell storage facility which contains one or more samples of T cells that recognize HPV peptide antigens produced by the process of claim 1 in combination with a storage or freezing medium; wherein said one or more samples is optionally associated, identified or indexed by information describing its source, including full or partial DNA sequence information, information describing its histocompatibility, including major and/or minor histocompatibility antigens or markers, and/or information about the peptide antigens it contains or recognizes.

27. An antigen-specific T cell bank comprising multiple samples of cryo- or otherwise preserved viable HPV antigen-specific T cells produced by the process of claim 1.

* * * * *